(12) United States Patent
Mussehl

(10) Patent No.: US 11,940,312 B2
(45) Date of Patent: Mar. 26, 2024

(54) REVERSIBLE KITCHEN DEVICES

(71) Applicant: Nuvier Holdings LLC, Lakeville, MN (US)

(72) Inventor: Anthony Michael Mussehl, Dundas, MN (US)

(73) Assignee: Nuvier Holdings LLC, Lakeville, MN (US)

( * ) Notice: Subject to any disclaimer, the term of this patent is extended or adjusted under 35 U.S.C. 154(b) by 0 days.

(21) Appl. No.: 18/061,352

(22) Filed: Dec. 2, 2022

(65) Prior Publication Data

US 2023/0175878 A1    Jun. 8, 2023

Related U.S. Application Data

(60) Provisional application No. 63/268,848, filed on Mar. 3, 2022, provisional application No. 63/264,933, filed on Dec. 3, 2021.

(51) Int. Cl.
     *G01F 19/00*          (2006.01)

(52) U.S. Cl.
     CPC .................... *G01F 19/002* (2013.01)

(58) Field of Classification Search
     CPC ..................................... G01F 19/002
     See application file for complete search history.

(56) References Cited

U.S. PATENT DOCUMENTS

| 2,256,865 | A | 9/1941 | Gilbert |
| 2,479,007 | A | 8/1949 | Gruben |
| 2,839,928 | A | 6/1958 | Fohrman |
| D369,304 | S | 4/1996 | Weterrings |
| D377,615 | S | 1/1997 | Weterrings |
| D403,255 | S | 12/1998 | Molenaar |
| D412,448 | S | 8/1999 | Bentson |
| D451,829 | S | 12/2001 | McGuyer |
| D562,159 | S | 2/2008 | Griffith et al. |
| D580,799 | S | 11/2008 | Curtin |

(Continued)

FOREIGN PATENT DOCUMENTS

| DE | 19518843 C1 * | 11/1996 | ........... D06F 39/024 |
| DE | 19518843 C1 | 11/1996 | |

(Continued)

*Primary Examiner* — Jamel E Williams
(74) *Attorney, Agent, or Firm* — Gallium Law; Wesley Schwie; Justin Schwechter

(57) ABSTRACT

The present disclosure includes a reversible and expandable measuring device comprising a handle having a first end and a second end opposite the first end, and a ring coupled to the second end of the handle. According to some examples, the reversible and expandable measuring device includes an expandable member coupled to an interior portion of a side wall of the ring. The expandable member may be configured to move between a first volumetric state and a second volumetric state. In some examples, when the expandable member is in the first volumetric state, the expandable member protrudes in a first direction away from a bottom end of the ring, and when the expandable member is in the second volumetric state, the expandable member protrudes in a second direction opposite the first direction. The first volumetric state may be larger than the second volumetric state.

20 Claims, 22 Drawing Sheets

(56) References Cited

U.S. PATENT DOCUMENTS

| | | | |
|---|---|---|---|
| D583,635 S | 12/2008 | Ikoma et al. | |
| D584,967 S | 1/2009 | Shamoon | |
| D588,947 S | 3/2009 | Curtin | |
| D645,705 S | 9/2011 | Shamoon | |
| D652,745 S | 1/2012 | Lee et al. | |
| D652,746 S | 1/2012 | Lee et al. | |
| D674,712 S | 1/2013 | Robbins et al. | |
| D758,215 S | 6/2016 | Yamazaki | |
| D758,894 S | 6/2016 | Anzalone et al. | |
| D787,957 S | 5/2017 | Tsengas | |
| D787,958 S | 5/2017 | Hume | |
| D818,229 S | 5/2018 | Ha et al. | |
| 10,393,564 B1 * | 8/2019 | Dabney | G01F 19/00 |
| 2005/0127074 A1 * | 6/2005 | Kusuma | B65D 21/086 |
| | | | 220/6 |
| 2006/0277994 A1 * | 12/2006 | Peterson | G01F 19/002 |
| | | | 73/426 |
| 2009/0183565 A1 * | 7/2009 | Shamoon | G01F 19/00 |
| | | | 220/666 |

FOREIGN PATENT DOCUMENTS

| | | | | |
|---|---|---|---|---|
| WO | 1996020877 A1 | 7/1996 | | |
| WO | WO-9620877 A1 * | 7/1996 | | G01F 19/00 |

* cited by examiner

REVERSIBLE KITCHEN DEVICES

TECHNICAL FIELD

The present disclosure relates to kitchen utensils. Specifically, the present disclosure relates to kitchen utensils capable of inverting upon themselves.

BACKGROUND

In the space of measuring utensils, there exists a subset of measuring utensils that claim to be "all-in-one." These utensils can change their exposed volumes, permitting a user to use a single measuring device to measure various volumes. Within this field, "invertible" measuring utensils exist, the sole purpose of which is to enable a user to procure every piece of material from the confines of said utensils. Additionally, "collapsible" measuring cups exist for the purposes of flattening for storage.

Within the space of baking trays, such as muffin trays, a subset of muffin trays has various-sized cavities for baking multiple elements simultaneously. In this field also exists muffin trays that are collapsible for storage, similar to the "collapsible" measuring cups described above.

The prior art of measuring utensils and muffin trays exhibits deficiencies stemming from proposed solutions to the problems they seek to solve. Thus, there is a need for systems and methods to remedy said deficiencies found in the prior art.

SUMMARY

The present disclosure includes a reversible and expandable measuring device comprising a handle comprising a first end and a second end opposite the first end. In some examples, the reversible and expandable measuring device includes a ring coupled to the second end of the handle, the ring including a top end, a bottom end opposite the top end, and a side wall extending between the top end and the bottom end. According to some examples, the reversible and expandable measuring device comprises an expandable member coupled to an interior portion of the side wall of the ring. The expandable member may be configured to move between a first volumetric state and a second volumetric state. In some examples, when the expandable member is in the first volumetric state, the expandable member protrudes in a first direction away from the bottom end of the ring. According to some examples, when the expandable member is in the second volumetric state, the expandable member protrudes in a second direction away from the top end of the ring, the second direction opposite the first direction. The first volumetric state may be larger than the second volumetric state.

In some examples, the expandable member is configured to move between the first volumetric state, the second volumetric state, and a third volumetric state. According to some examples, the second volumetric state is larger than the third volumetric state. When the expandable member is in the third volumetric state, the expandable member may protrude in the first direction.

In some examples, the expandable member is configured to move between the first volumetric state, the second volumetric state, the third volumetric state, and a fourth volumetric state. According to some examples, the third volumetric state is larger than the fourth volumetric state. When the expandable member is in the fourth volumetric state, the expandable member may protrude in the second direction.

In some examples, the expandable member is configured to move between the first volumetric state, the second volumetric state, the third volumetric state, the fourth volumetric state, and a fifth volumetric state. According to some examples, the fourth volumetric state is larger than the fifth volumetric state. When the expandable member is in the fifth volumetric state, the expandable member may protrude in the first direction.

In some examples, the first volumetric state defines one cup. According to some examples, the second volumetric state defines two-thirds of a cup. The third volumetric state may define one-half of a cup. In some examples, the fourth volumetric state defines one-third of a cup. According to some examples, the fifth volumetric state defines one-quarter of a cup.

The reversible and expandable measuring device may further comprise a first marked indicia located at a first location on the expandable member, the first marked indicia configured to provide information regarding a volume of the first volumetric state. In some examples, the reversible and expandable measuring device further comprises a second marked indicia located at a second location on the expandable member, the second marked indicia configured to provide information regarding a volume of the second volumetric state. According to some examples, the reversible and expandable measuring device further comprises a third marked indicia located at a third location on the expandable member, the third marked indicia configured to provide information regarding a volume of the third volumetric state. The reversible and expandable measuring device may further comprise a fourth marked indicia located at a fourth location on the expandable member, the fourth marked indicia configured to provide information regarding a volume of the fourth volumetric state. In some examples, the reversible and expandable measuring device further comprises a fifth marked indicia located at a fifth location on the expandable member, the fifth marked indicia configured to provide information regarding a volume of the fifth volumetric state. According to some examples, the first location, the second location, the third location, the fourth location, and the fifth location are different locations.

The expandable member may be configured to detachably couple to the ring. In some examples, the reversible and expandable measuring device further comprises a channel extending around a perimeter of the expandable member, the channel configured to receive the ring. According to some examples, the expandable member further comprises an upper lip and a lower lip facing the upper lip. The upper and lower lip may be configured to mechanically couple the expandable member to the ring. In some examples, the ring is located between the upper and lower lip. The expandable member defines an uppermost portion and a lowermost portion of the reversible and expandable measuring device.

According to some examples, the ring is detachably coupled to the second end of the handle. The expandable member may comprise a silicone material.

In some examples, the reversible and expandable measuring device further comprises a first living hinge configured to enable the expandable member to move between the first volumetric state and the second volumetric state. According to some examples, the reversible and expandable measuring device further comprises a second living hinge. The expandable member may be configured to define a third volumetric state and a fourth volumetric state. In some examples, the second living hinge is configured to enable the expandable member to move between the first volumetric state and the third volumetric state. According to some examples, the second living hinge is configured to allow for the expandable member to move between the second volumetric state and the fourth volumetric state. The expandable member may be configured to define a fifth volumetric state. In some examples, the reversible and expandable measuring device further comprises a third living hinge configured to enable the expandable member to move between the third volumetric state and the fifth volumetric state.

Also included in the present disclosure is a reversible and expandable muffin tray comprising a flat sheet including a receiving well, the flat sheet including a top end, and a bottom end opposite the top end. In some examples, the reversible and expandable muffin tray comprises an expandable member coupled to an interior portion of the receiving well of the flat sheet. According to some examples, the expandable member is configured to define a first volumetric state and a second volumetric state. When the expandable member is in the first volumetric state, the expandable member may protrude in a first direction away from the bottom end of the flat sheet. In some examples, when the expandable member is in the second volumetric state, the expandable member protrudes in a second direction away from the top end of the flat sheet, the second direction opposite the first direction. According to some examples, the first volumetric state is larger than the second volumetric state.

The expandable member may be configured to detachably couple from the receiving well. In some examples, the reversible and expandable muffin tray further comprises a channel that extends around a perimeter of the expandable member, the channel configured to couple to the receiving well. According to some examples, the expandable member further comprises an upper lip and a lower lip facing the upper lip. The upper lip and the lower lip may be configured to mechanically couple the expandable member to the receiving well. In some examples, the reversible and expandable muffin tray further comprises a living hinge configured to allow the expandable member to move between the first volumetric state and the second volumetric state.

BRIEF DESCRIPTION OF THE DRAWINGS

These and other features, aspects, and advantages are described below with reference to the drawings, which are intended to illustrate, but not to limit, the invention. In the drawings, like reference characters denote corresponding features consistently throughout similar embodiments.

COMPONENT INDEX

Figure 1:
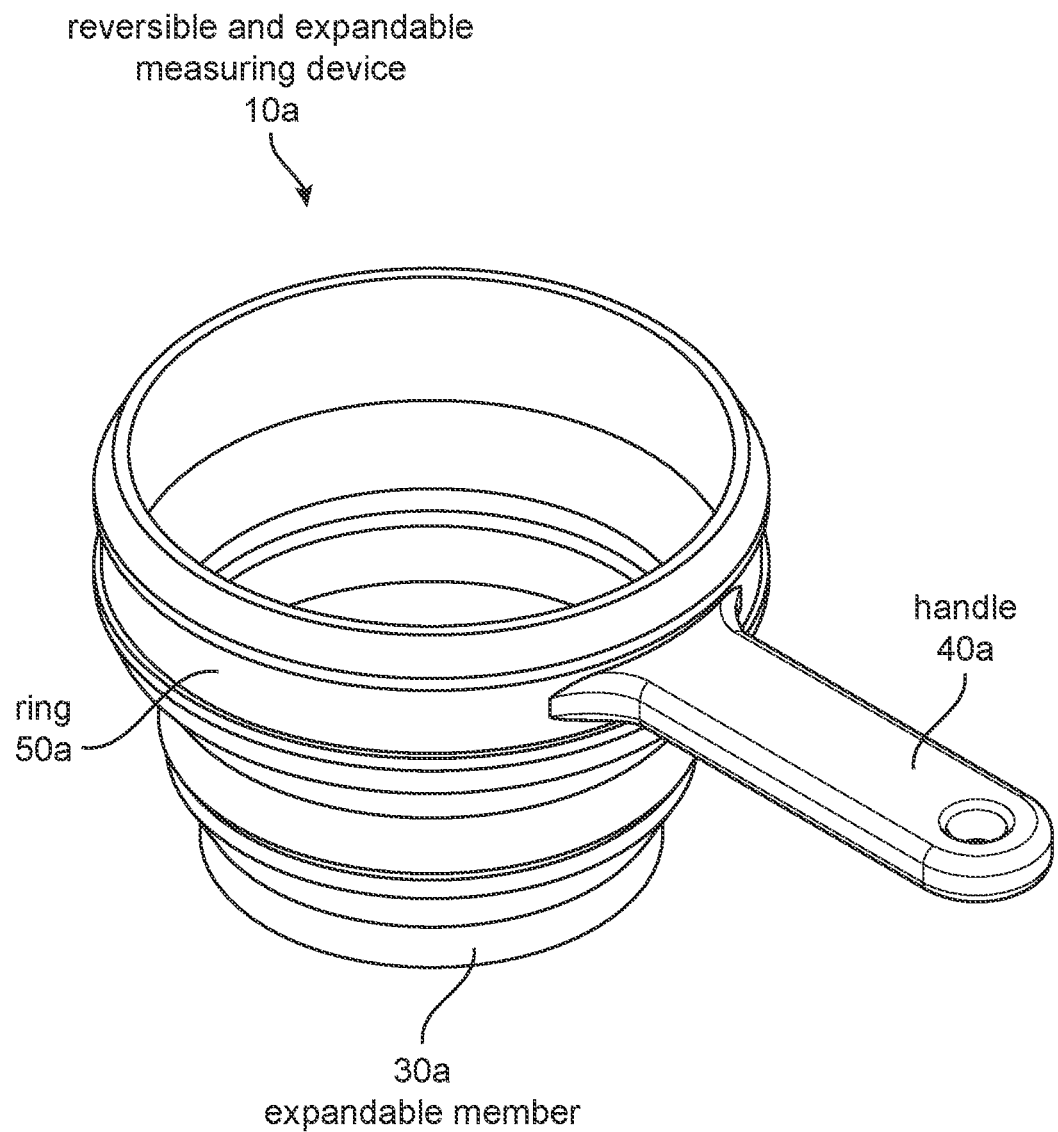
FIG. 1 illustrates a perspective view of a reversible and expandable measuring device, according to some examples.

10—Reversible and expandable measuring device
10a—Reversible and expandable measuring device
10b—Reversible and expandable measuring device
10c—Reversible and expandable measuring device
20—Reversible and expandable muffin tray
30—Expandable member
30a—Expandable member
30b—Expandable member
40—Handle
40a—Handle
40b—Handle
50—Ring
50a—Ring
50b—Ring
50c—Ring
402—First end
404—Second end
406—Top end
408—Bottom end
410—Side wall
412—Interior portion
502—Channel
504—Upper lip
506—Lower lip
508—Uppermost portion
510—Lowermost portion
512—Silicone material 602—First state
604—First volume
606—Living hinge
606a—First living hinge
606b—Second living hinge
606c—Third living hinge
608—First direction
702—Second state
704—Second volume
706—Second direction
802—Third state
804—Third volume
902—Fourth state
904—Fourth volume
1002—Fifth state
1004—Fifth volume
1202—Flat sheet
1204—Top end
1206—Bottom end
1502—Receiving well
1504—Interior portion
1602—Channel
1604—Upper lip
1606—Lower lip
1702—First state
1704—First volume
1706—Living hinge
1708—First direction
1802—Second state
1804—Second volume
1806—Second direction

DETAILED DESCRIPTION

The present disclosure includes examples of reversible and expandable measuring devices and systems that enable a single device to move between different volumetric states to enhance user flexibility while reducing storage space requirements. Specifically, FIGS. 1, 2, 3, 4A, 4B, 5, 6, 7, 8, 9, 10, and 11 illustrate devices and systems used to configure various measurement volumes, such as those found in traditional measuring cups or spoons. FIGS. 12, 13A, 13B, 14, 15, 16, 17, 18, 19, and 20 show devices and systems that may be used for processing different containment volumes but not necessarily for the purposes of measuring, such as differentiating between standard sizes of cupcakes and muffins.

Prior art devices for limiting the space taken by measuring cups include stackable measuring cups. These stackable measuring cups, however, have multiple issues. Storage space is limited to the size of the largest measuring cup. The user must sort through all the measuring cups to find the desired size. The measuring cups must be sorted correctly to maximize storage efficiency (i.e., smallest to largest). Also, each measuring cup must be individually manufactured.

Additional prior art devices for reducing the storage space of measuring cups include collapsible measuring cups. However, these collapsible measuring cups are not stackable, so they can easily become scattered. Some collapsible measuring cups seek to solve this problem by including holes in each measuring cup and a ring to keep them all together, but this causes the additional problem that the ring can make it challenging to use only one measuring cup, and washing the measuring cups becomes less effective. Additionally, while each measuring cup takes up less space in isolation, the fact that there are multiple measuring cups means that storage is still inefficient.

Other prior art devices for combining measuring cups into a single device include varying size plunger measuring cups, where the plunger is pressed in to control the volume of the measuring cup, thereby having a single measuring cup for all measurement needs. However, this solution still limits storage space to the size of the largest volume allotted by such a measuring cup. These measuring cups are also difficult to wash and obtain the contents from the measuring cup after measuring has been performed. The multiple components make it difficult to manufacture, and the plunger itself may degrade over time or with constant use.

The last devices in the prior art seeking to solve the problem of combining measuring cups into a single device include adjustable sliding/hinge scoops, such as those with a handle that slides into the scoop or a hinge that controls a flap to adjust the volume. However, these also show deficiencies, including the large handle making storage difficult. Sliding or hinge mechanisms make washing the utensil more difficult. Degradation of moving components means that the device may be more challenging to move or control over time. The seals may leak, and the multiple parts make manufacturing difficult.

The reversible and expandable measuring device as seen and described in FIGS. 1-10 seeks to remedy these deficiencies. Examples disclosed herein include a collapsible measuring device to maximize storage efficiency and expandable to enable one device to provide several volumetric states for enhanced flexibility.

The figures herein generally show the expandable members with a portion cut out. It is understood that the expandable members continue about the entire perimeter, creating a fillable volume. This cutout is only to better visualize the expandable members' living hinges and channel structure.

Figure 2:
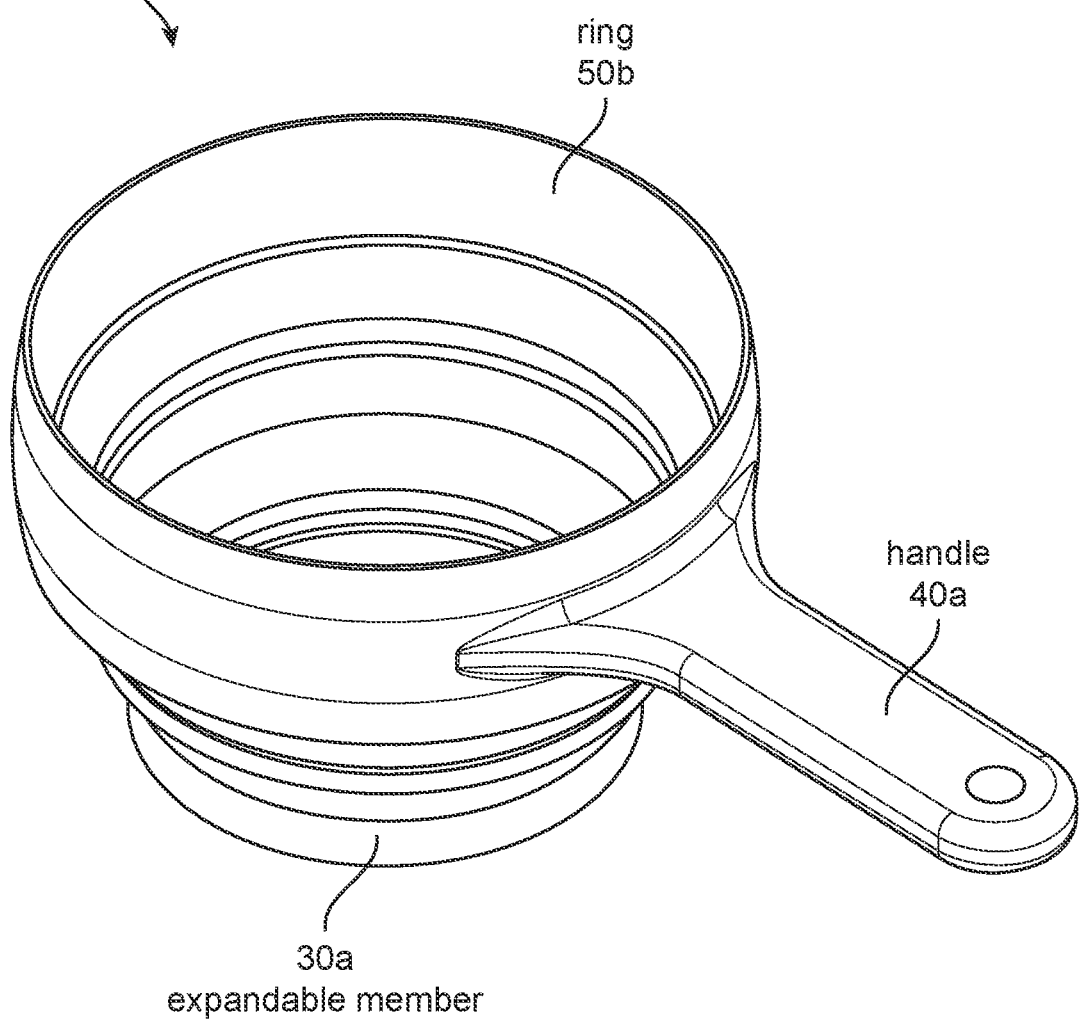
FIG. 2 illustrates a perspective view of an additional example of a reversible and expandable measuring device.
Figure 3:
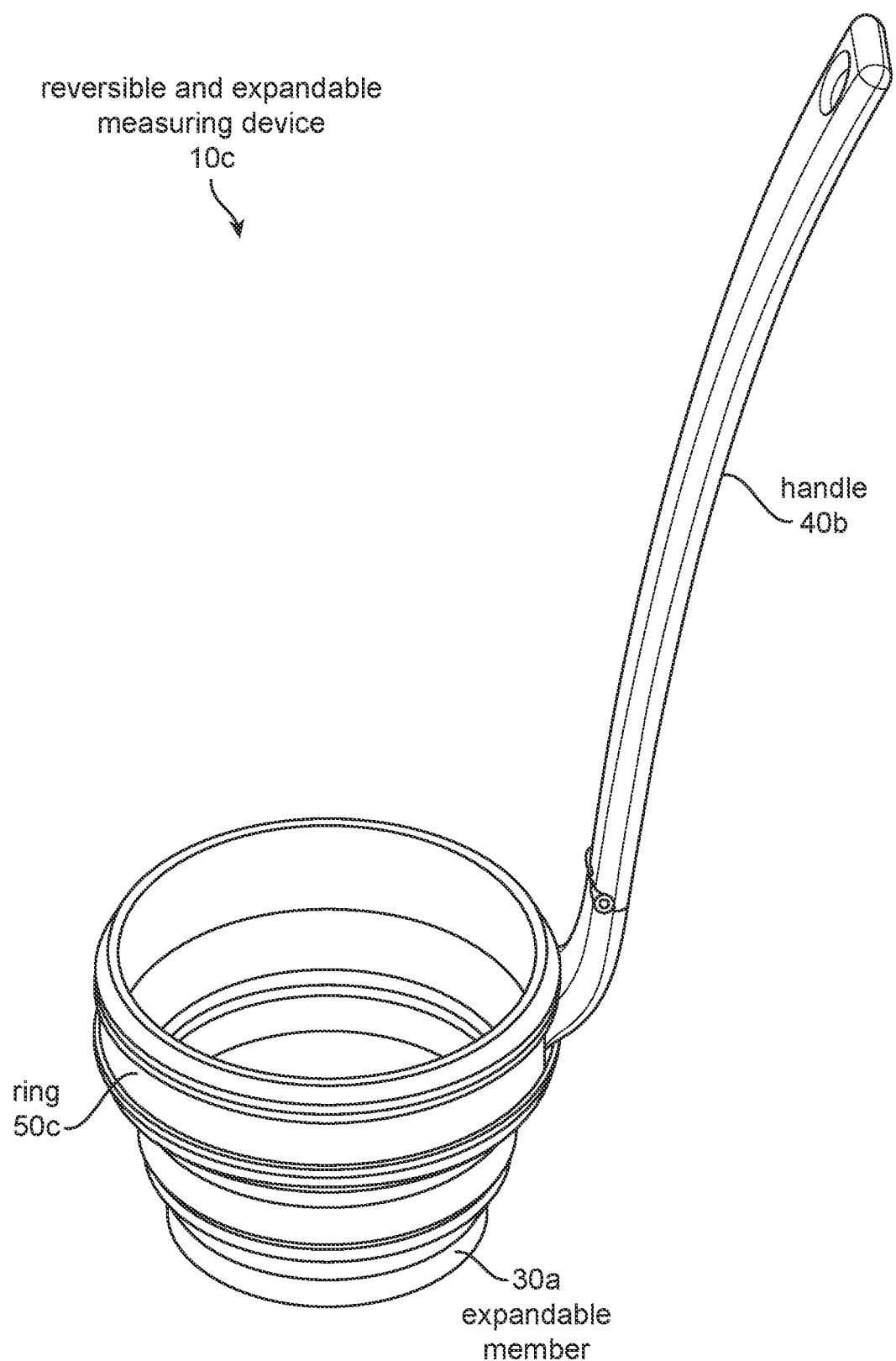
FIG. 3 illustrates a perspective view of another example of a reversible and expandable measuring device.

FIGS. 1, 2, and 3 illustrate various examples of the reversible and expandable measuring device 10. Specifically, FIG. 1 illustrates a reversible and expandable measuring device 10a, including a handle 40a, a ring 50a, and an expandable member 30a. The example of FIG. 1 includes an expandable member 30a that is removably coupled to the ring 50a. As such, the expandable member 30a may be detached from said ring 50a for cleaning or using the expandable member 30a in isolation (i.e., scenarios where the handle 40a and ring 50a are unnecessary).

The reversible and expandable measuring device 10b of FIG. 2 is similar to the reversible and expandable measuring device 10a FIG. 1, including a similarly shaped handle 40a. However, dissimilar to FIG. 1, the reversible and expandable measuring device 10b of FIG. 2 may include an expandable member 30a that is more permanently coupled to the ring 50b. In this example, the expandable member 30a may not be readily detached from the ring 50b, and the reversible and expandable measuring device 10b may serve as a more traditional style measuring cup. In this example, the entirety of the reversible and expandable measuring device 10b may still be washed together.

FIG. 3 illustrates a reversible and expandable measuring device 10c, including a "ladle-style" handle 40b attached to the ring 50c. Dissimilar to the handle 40a of FIGS. 1 and 2, the "ladle-style" handle 40b may permit a user to reach the reversible and expandable measuring device 10c into the depths of a container while preventing strain on the user, similar to a traditional ladle. Shown but not labeled on the handle 40b is a hinge to permit the handle 40b to fold upon itself, diminishing the footprint of the reversible and expandable measuring device for storage. A ring 50c is coupled to the handle 40b. The ring 50c may be similar to the ring 50a of FIG. 1 or the ring 50b of FIG. 2.

The ring 50c may either removably (like in FIG. 1) or semi-permanently (like in FIG. 2) couple to the expandable member 30a. In examples where the ring 50c is removably coupled to the expandable member 30a, the expandable member 30a may be detached from the ring 50c, flipped over, and the reattached to the ring 50c. This may provide the expandable member 30a with the reversibility as disclosed herein, without the need for the handle 40b to also be reversible. In this instance, the volumes achieved through reversing (or inverting) the expandable member 30a may be achieved through removing the expandable member 30a from the handle 40b and reattaching the expandable member 30a to the handle 40b in an inverted orientation.

Figure 4A:
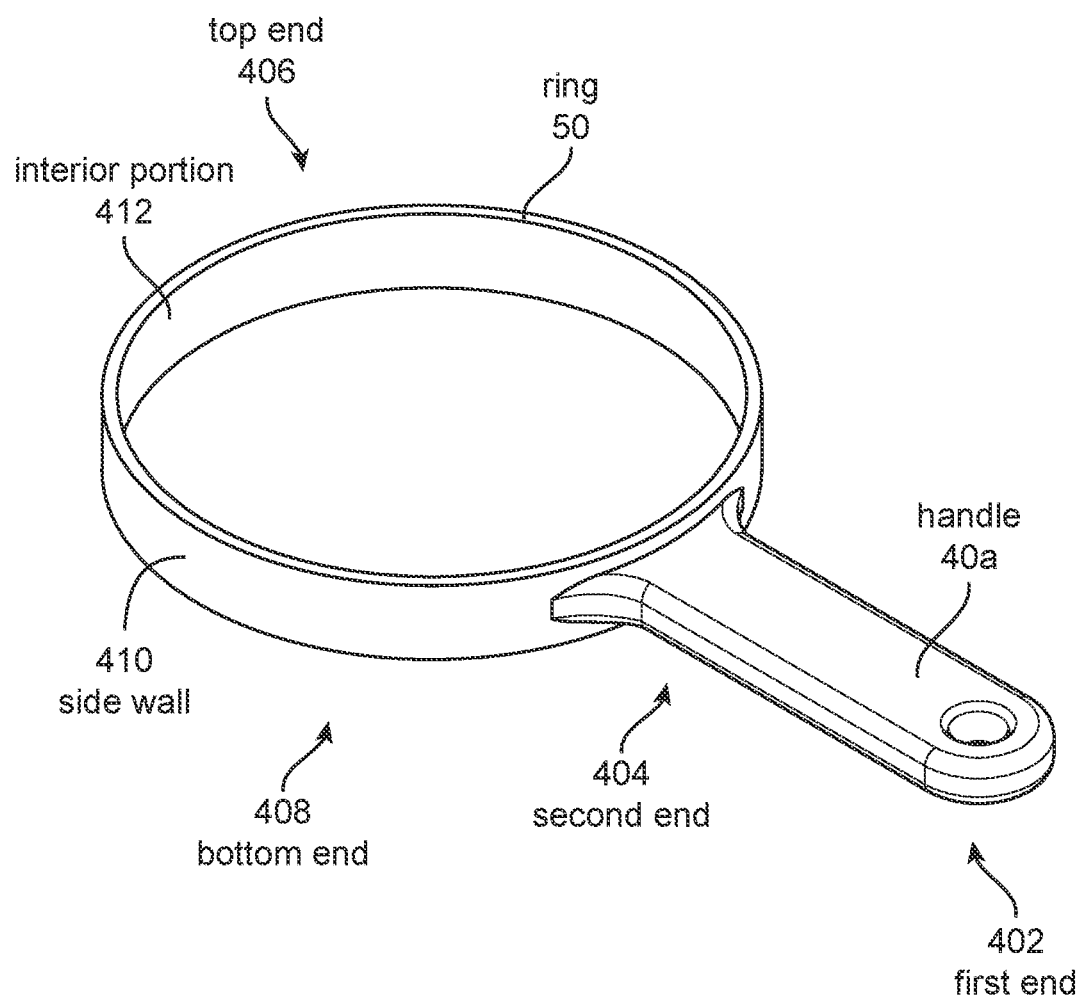
FIG. 4A illustrates a perspective view of a handle and ring as they may appear according to the examples of FIGS. 1 and 2.
Figure 4B:
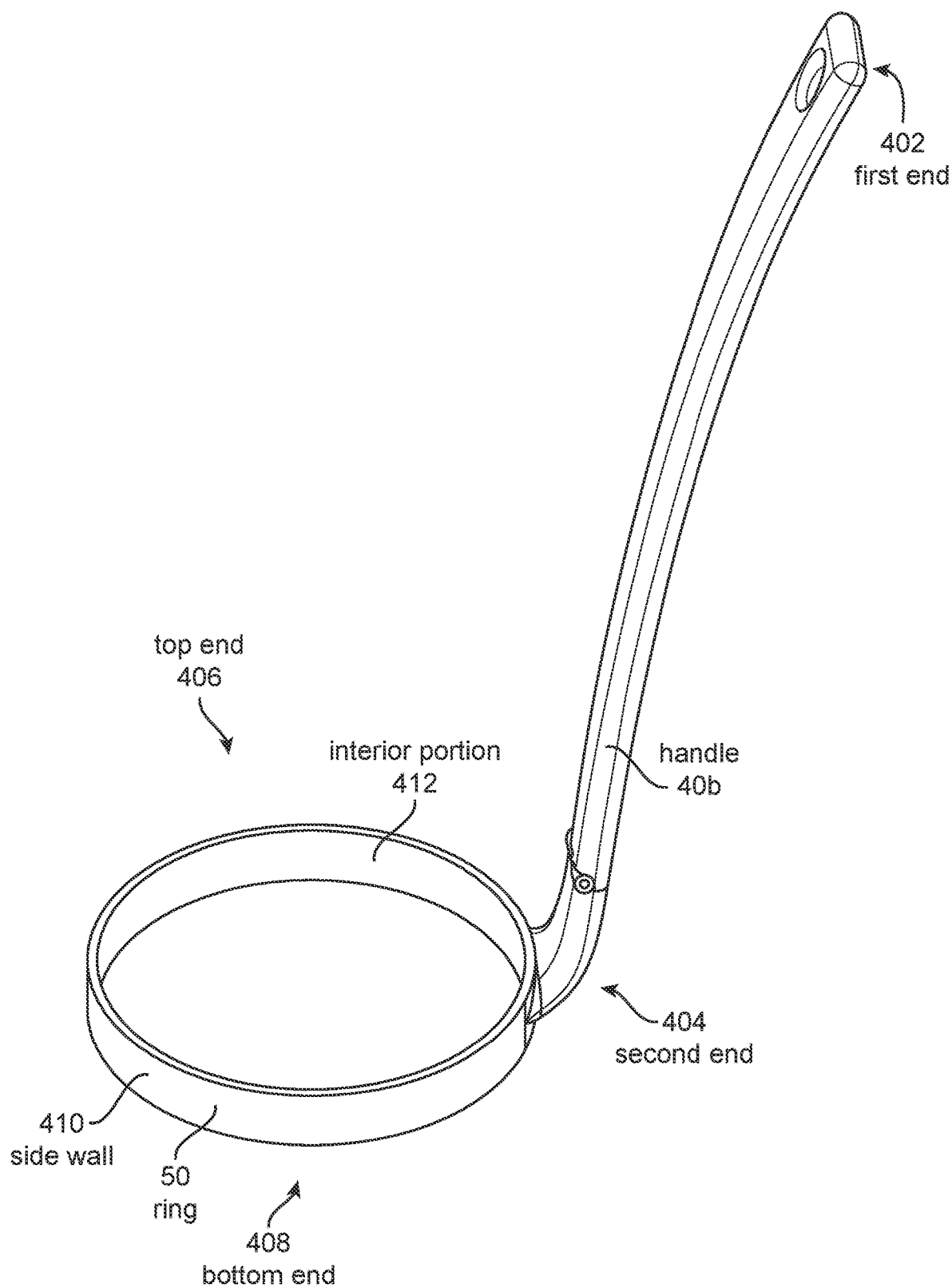
FIG. 4B illustrates a perspective view of a handle and ring as they may appear according to the example of FIG. 3.

FIGS. 4A and 4B illustrate the aforementioned handles 40 and rings 50 separate from the expandable member 30. Specifically, FIG. 4A illustrates the handle 40a of FIGS. 1 and 2. As shown in FIG. 4A, the handle 40a may include a first end 402 and a second end 404. The first end 402 is a location where a user may hold the handle 40a. The second end 404 couples the handle 40a to the ring 50. This coupling may be a permanent or semi-permanent coupling, or the handle 40a may be detachably coupled to the ring 50 for ease of storage or cleaning.

The ring 50 includes a side wall 410 about its perimeter. The ring also includes a top end 406 and a bottom end 408, which may be helpful in orienting the reversible and expandable measuring device in the disclosure below. The ring 50 also includes an interior portion 412. This interior portion will be described further for a method of coupling the ring 50 to the expandable member 30.

FIG. 4B illustrates the "ladle-style" handle 40b of FIG. 3 without the expandable member 30 present. Similar to FIG. 4A, the handle 40b includes a first end 402 and a second end 404. The second end 404 is shown between the aforementioned shown but not labeled hinge and the ring 50. The first end 402 may refer to any portion of the handle 40b above said hinge and may be where a user chooses to hold the handle 40b. The ring 50 of FIG. 4B comprises the same disclosure as that of FIG. 4A, but it will be reiterated here.

The second end 404 couples the handle 40a to the ring 50. This coupling may be a permanent or semi-permanent coupling, or the handle 40a may be detachably coupled to the ring 50 for ease of storage or cleaning. The ring 50 includes a side wall 410 about its perimeter.

The ring also includes a top end 406 and a bottom end 408. The use of the terms "top end" and "bottom end" is understood to be subjective, and the reversal of the operation of the device so that the below disclosure about said top end 406 and bottom end 408 happens in a mirror-image fashion is also enabled. The ring 50 also includes an interior portion 412. This interior portion will be described further for a method of coupling the ring 50 to the expandable member 30.

Figure 5:
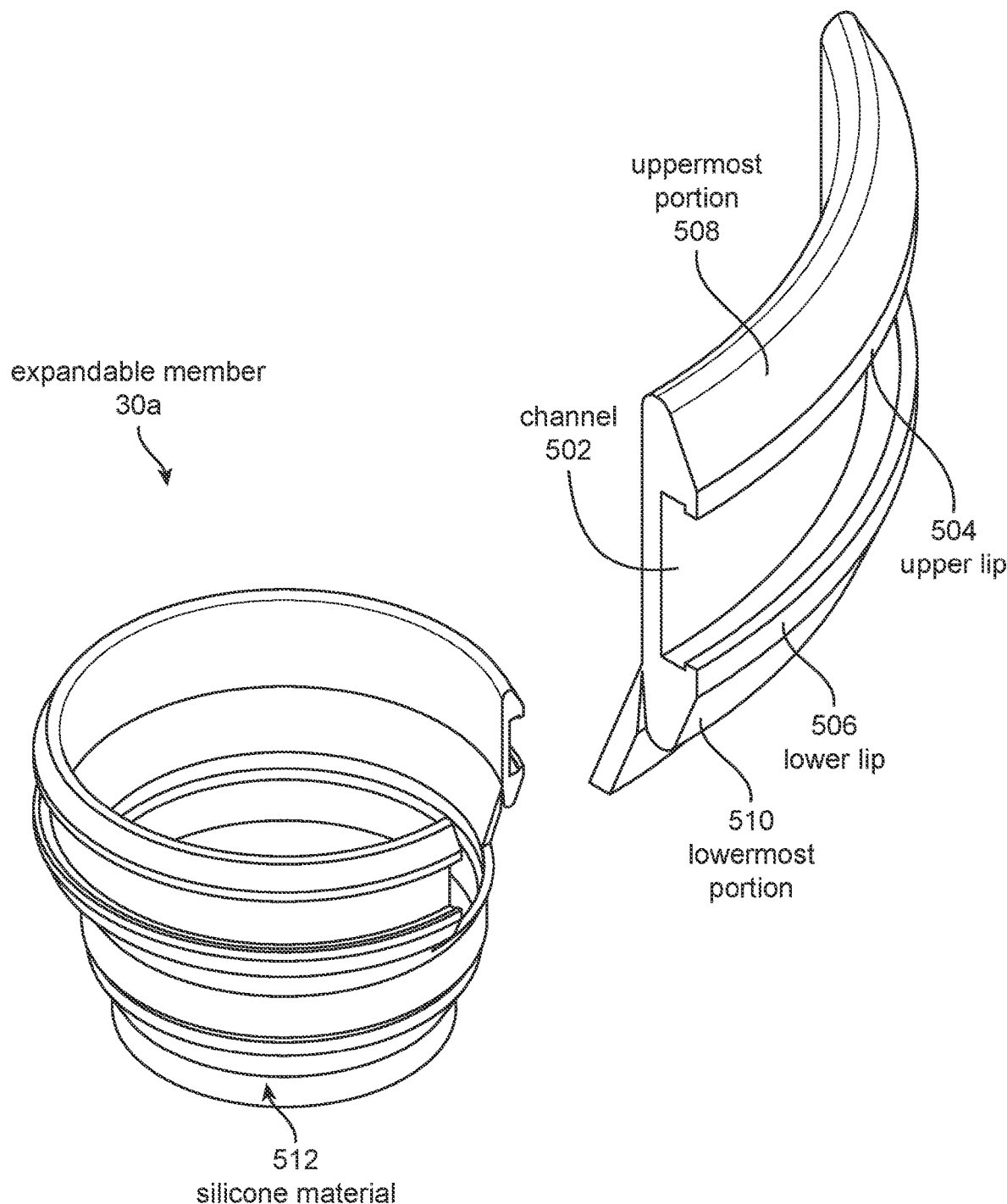
FIG. 5 illustrates a perspective view of an expandable member, according to some examples.

FIG. 5 illustrates a perspective view of an expandable member 30a, including an enlarged view of the top portion of the expandable member 30a. In this enlarged view, a channel 502 extends around the perimeter of the expandable member 30a. This channel 502 is sized such that the ring 50 may fit within the channel 502, thereby operationally coupling the ring 50 with the expandable member 30a. The expandable member 30a includes an uppermost portion 508 and a lowermost portion 510. These portions refer to the locations on the expandable member 30a separate from those parts of the expandable member 30a that can fold in on themselves through living hinges, as will be explored in FIGS. 6-10.

The uppermost portion 508 may include an upper lip 504, and the lowermost portion 510 may include a lower lip 506. When a ring 50 is inserted into the channel 502, the upper lip 504 and the lower lip 506 may prevent unintentional decoupling of the ring 50 with the expandable member 30a by extending slightly over the side wall 410. Also shown in FIG. 5 is that the expandable member 30a may be constructed of a flexible material, such as silicone material 512. While silicone material 512 is not strictly necessary, a flexible and food-safe material is recommended for kitchen utensils such as those described in the present disclosure.

FIGS. 6-10 illustrate perspective views of the expandable member 30a in various configurations showing five distinct volumes. These five distinct volumes result from including three living hinges 606 (first living hinge 606a, second living hinge 606b, and third living hinge 606c). It is appreciated and understood that including more living hinges 606 would increase the number of distinct configurations that an expandable member 30 may have. Any adjustments to this number of living hinges 606 are merely duplicative of the current invention.

For this disclosure, a living hinge 606 in its extended configuration will be referred to as "open," and a living hinge 606 in its nonextended configuration will be referred to as "closed."

Figure 6:
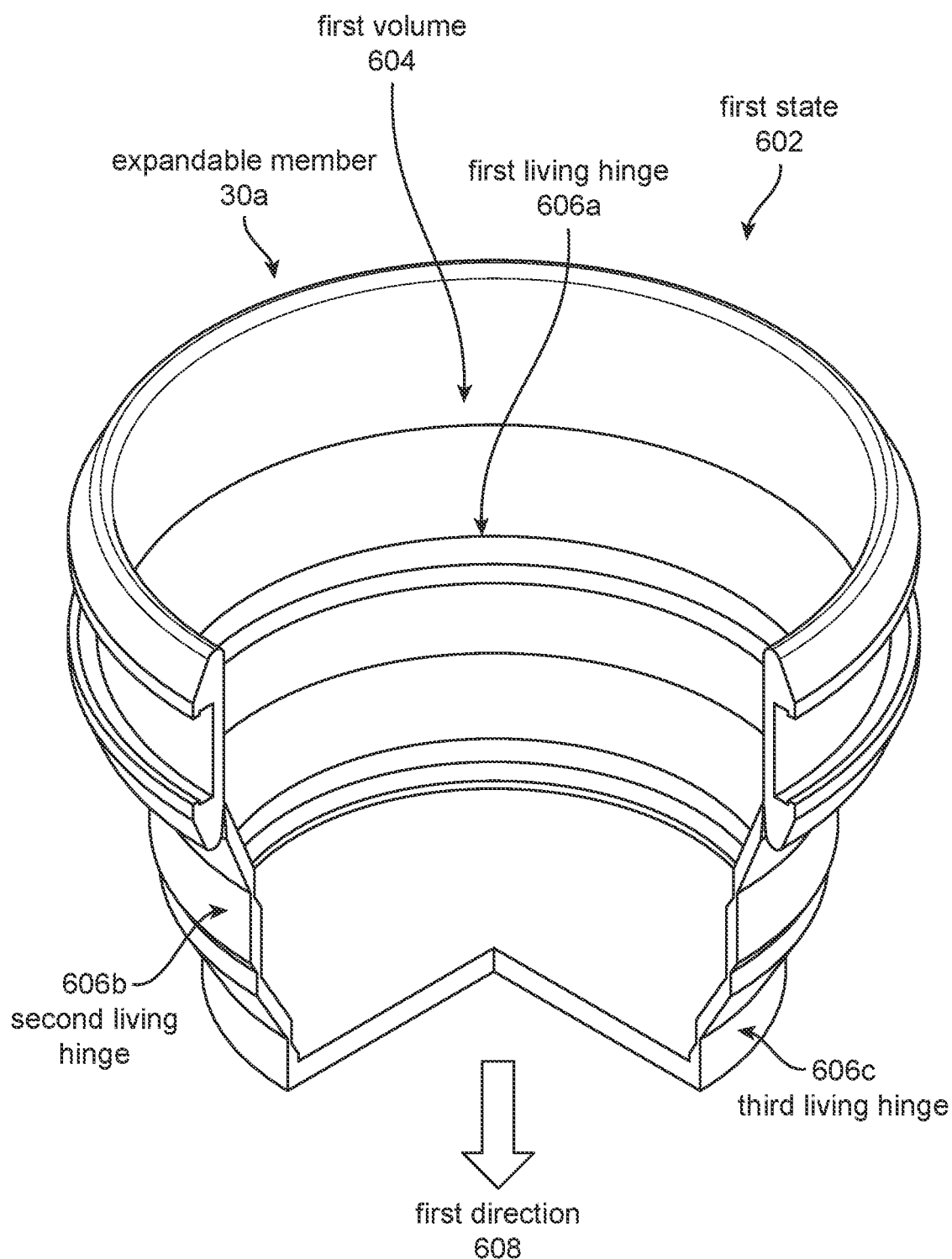
FIG. 6 illustrates a perspective view of the expandable member of FIG. 5 in a first state, according to some examples.

FIG. 6 shows a perspective view of the expandable member 30a defining a first state 602. In the first state 602, the expandable member 30a defines a first volume 604, which is the largest volume possible by the expandable member 30a. In the first volume 604, the first living hinge 606a, the second living hinge 606b, and the third living hinge 606c are all open or in the extended configuration. The expandable member 30a may protrude in a first direction 608, extending out of the bottom end 408 of a ring 50.

Figure 7:
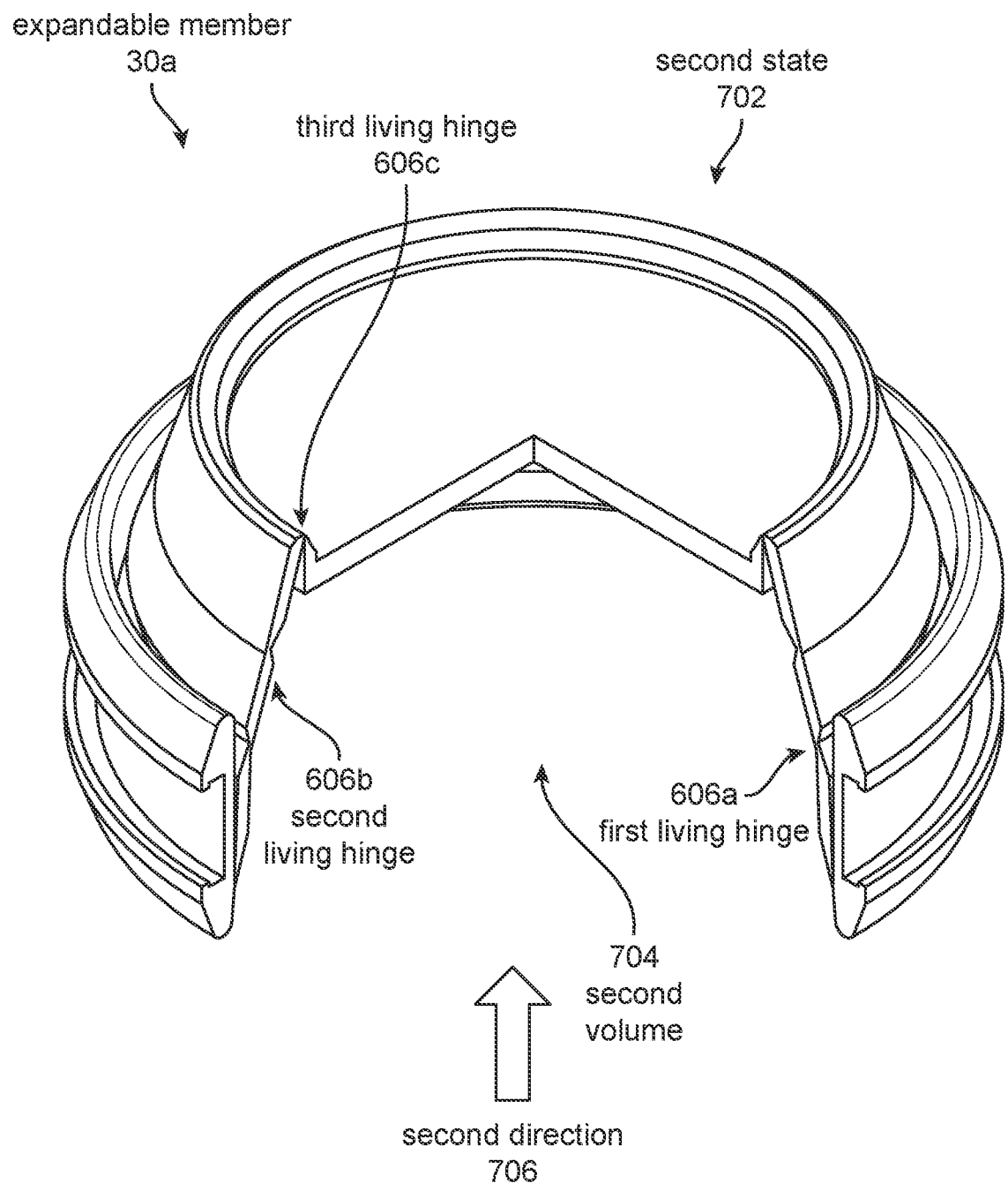
FIG. 7 illustrates a perspective view of the expandable member of FIG. 5 in a second state, according to some examples.

FIG. 7 illustrates a perspective view of the expandable member 30a in a second state 702. In this second state 702, the expandable member 30a defines a second volume 704 which is smaller than the first volume 604. This results from the third living hinge 606c being closed or in a nonextended configuration, while the first living hinge 606a and the second living hinge 606b are both open.

In this second state 702, the expandable member 30a has been effectively inverted into itself, and the surface area that comprised the exterior of the expandable member 30a in the first state 602 now defines the interior of the expandable member 30a in this second volumetric state. The discrepancy in volume between the first state 602 and the second state 702 is caused by the base being relatively higher in the second state 702, thus lowering the effective volume. Because the expandable member 30a has been effectively inverted upon itself, it may protrude in a second direction 706, extending out of the top end 406 of a ring 50.

Figure 8:
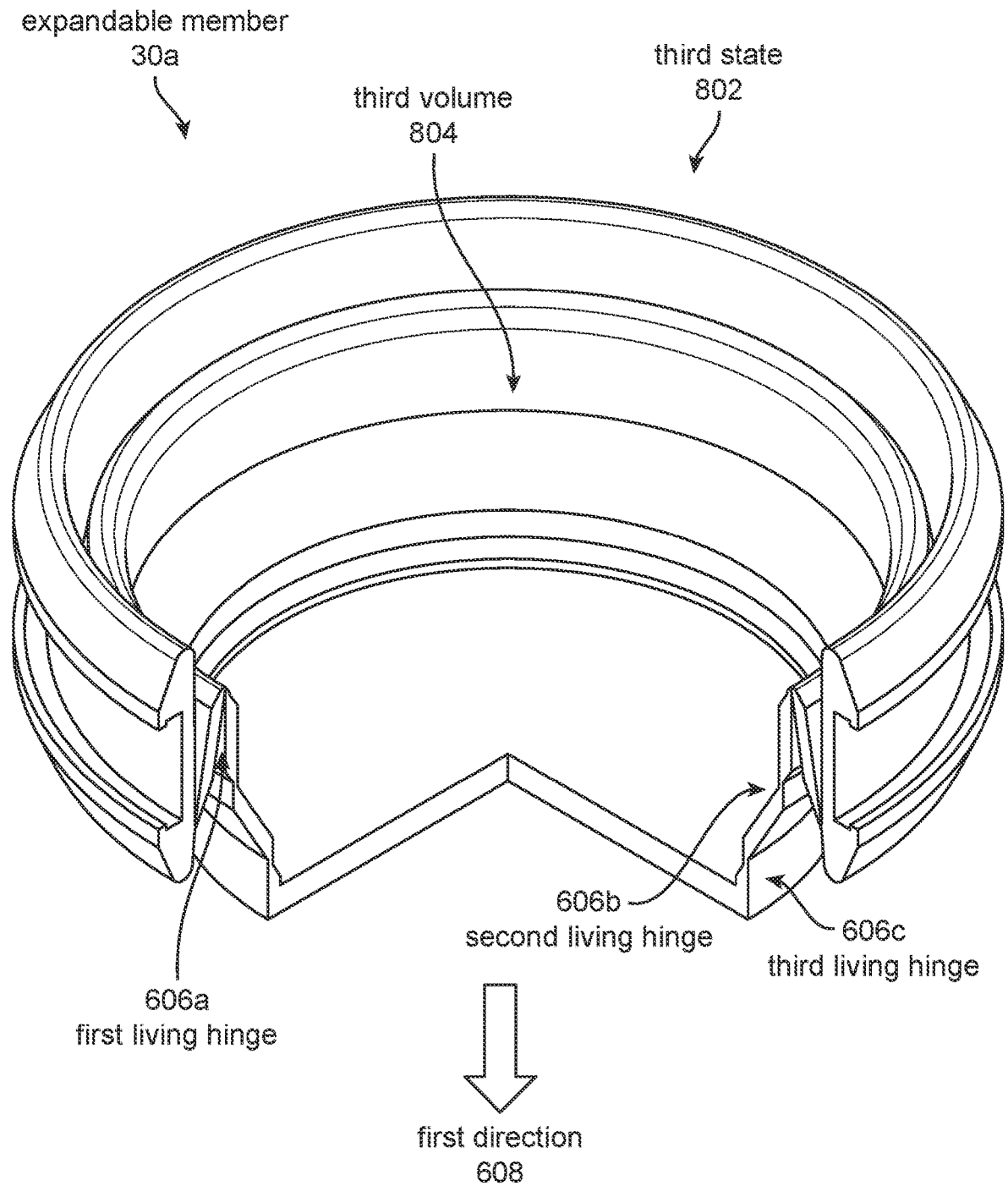
FIG. 8 illustrates a perspective view of the expandable member of FIG. 5 in a third state, according to some examples.

FIG. 8 illustrates a perspective view of the expandable member 30a in a third state 802. In this third state 802, the expandable member 30a defines a third volume 804 which is smaller than the second volume 704. This is a result of the first living hinge 606a being closed, while the second living hinge 606b and the third living hinge 606c are both open.

In this third state 802, the expandable member 30a points in the first direction 608, similar to the orientation of the first state 602. However, the closing of the first living hinge 606a decreases the height of the shape produced by the expandable member 30a, thereby decreasing the effective volume.

Figure 9:
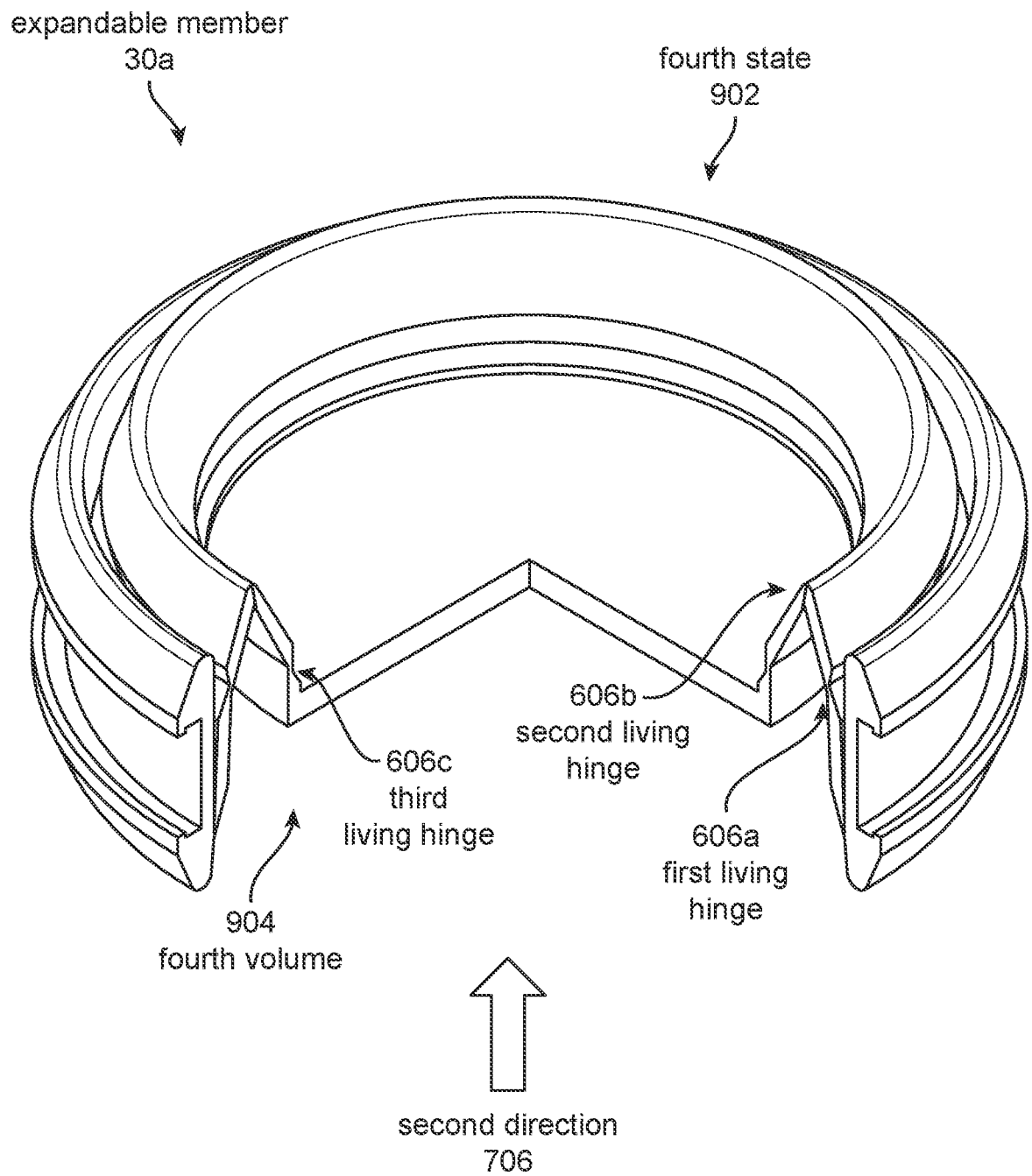
FIG. 9 illustrates a perspective view of the expandable member of FIG. 5 in a fourth state, according to some examples.

FIG. 9 illustrates a perspective view of the expandable member 30a in a fourth state 902. In this fourth state 902, the expandable member defines a fourth volume 904 which is smaller than the third volume 804. This is a result of the second living hinge 606b being closed, while the first living hinge 606a and the third living hinge 606c are both open.

In this fourth state 902, the expandable member 30a points in the second direction 706, similar to the orientation of the second state 702. However, the closing of the second living hinge 606b decreases the height of the shape produced by the expandable member 30a, thereby decreasing the effective volume.

Figure 10:
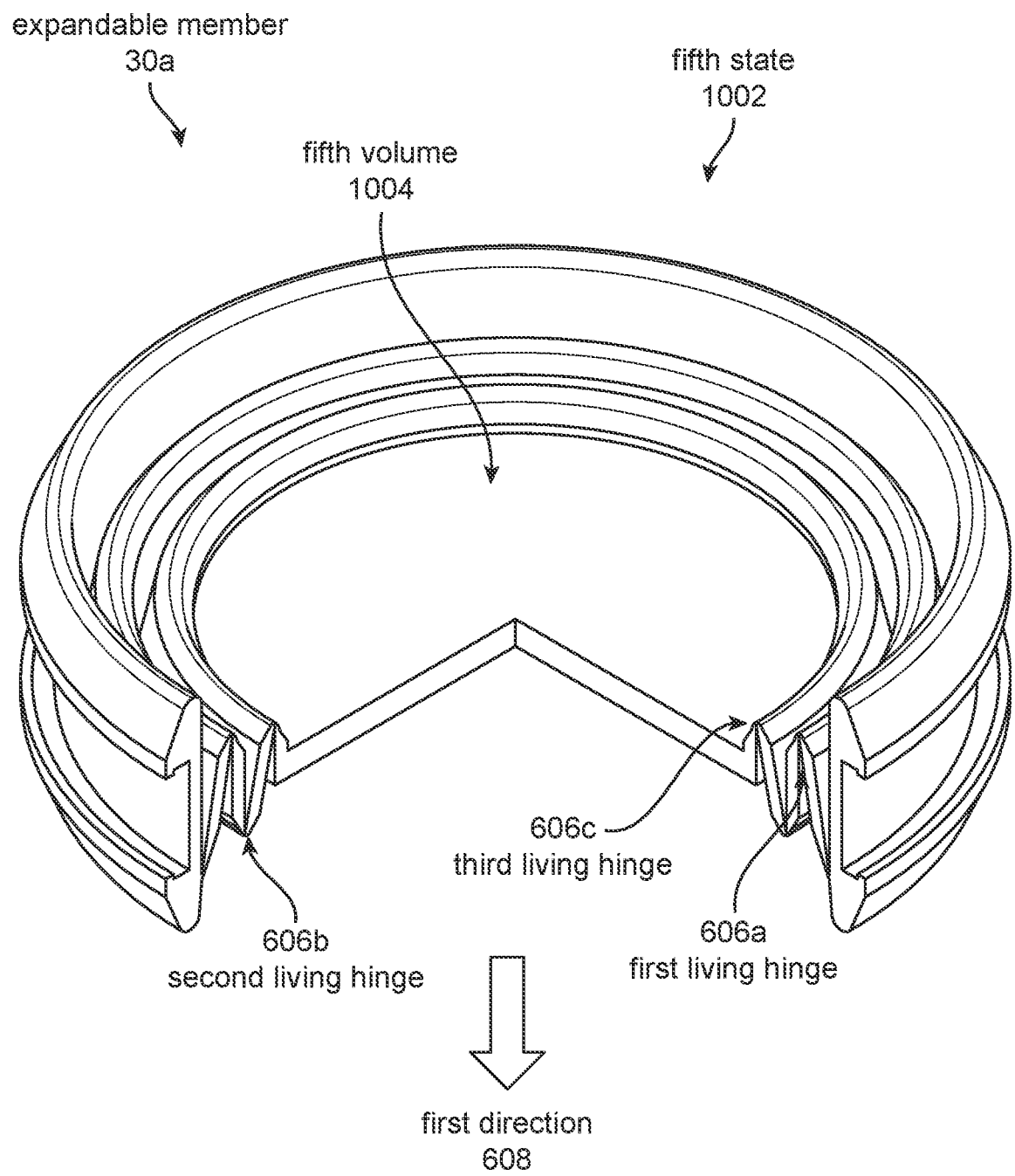
FIG. 10 illustrates a perspective view of the expandable member of FIG. 5 in a fifth state, according to some examples.

FIG. 10 shows a perspective view of the expandable member 30a in a fifth state 1002. In this fifth state 1002, the expandable member 30a defines a fifth volume 1004 which is smaller than the fourth volume 904. This is a result of the first living hinge 606a, the second living hinge 606b, and the third living hinge 606c being closed. This is also effectively the most collapsed, and thus smallest profile, possible by the expandable member 30a, and may be helpful for purposes beyond measuring, such as storage.

In this fifth state 1002, the expandable member 30a points in the first direction 608, similar to the orientation of the first state 602 and the third state 802. However, the closing of the first living hinge 606a, the second living hinge 606b, and the third living hinge 606c decrease the height of the shape produced by the expandable member 30a, thereby decreasing the effective volume.

Figure 11:
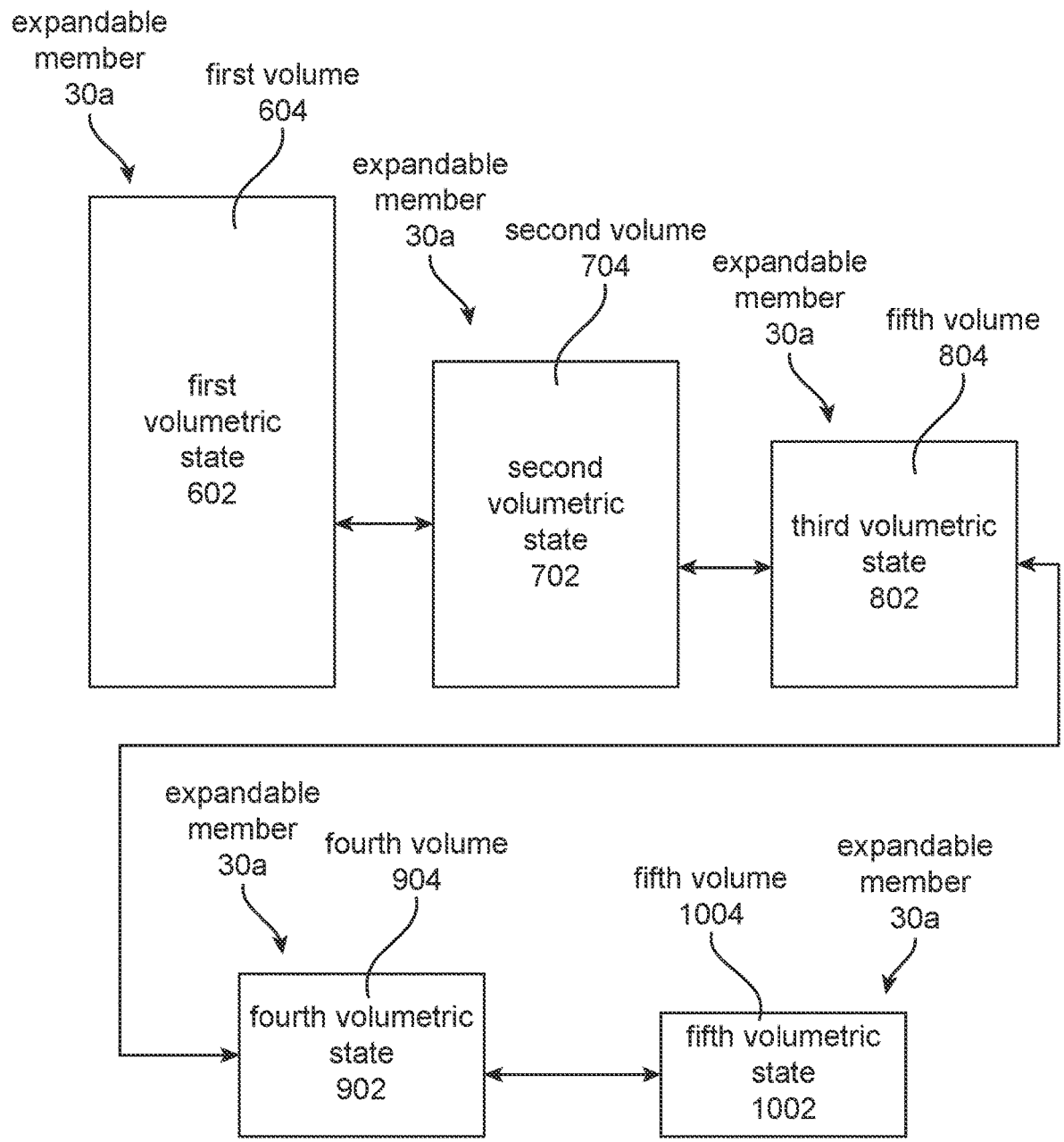
FIG. 11 illustrates a diagrammatic view of five states having different volumes, according to some examples.

FIG. 11 illustrates a diagrammatic view of five volumetric states having different volumes. For the purposes of this disclosure, it is understood that the use of "state" and "volumetric state" are interchangeable, e.g., in FIG. 6 the expandable member 30a is referred to as being in a first state 602, while in FIG. 11 the expandable member 30a is referred to as being in a first volumetric state 602.

FIG. 11 shows different sizes of the first volume 604 of the first volumetric state 602, the second volume 704 of the second volumetric state 702, the third volume 804 of the third volumetric state 802, the fourth volume 904 of the fourth volumetric state 902, and the fifth volume 1004 of the fifth volumetric state 1002. Double-sided arrows indicate possible movements of the expandable member 30a from the first volumetric state 602 to the second volumetric state 702, the second volumetric state 702 to the third volumetric state 802, the third volumetric state 802 to the fourth volumetric state 902, and the fourth volumetric state 902 to the fifth volumetric state 1002. The arrows being double-sided show that reverse movements are also possible.

While not indicated in FIG. 11, movements between any two states are possible without being in any intermediary state. For example, the first volumetric state 602 may be moved directly into the third volumetric state 802 and back. The first volumetric state 602 may also be moved directly into the fourth volumetric state 902 and back. The first volumetric state 602 may also be moved directly into the fifth volumetric state 1002 and back.

The second volumetric state 702 may be moved directly into the fourth volumetric state 902 and back. The second volumetric state 702 may also be moved directly into the fifth volumetric state 1002 and back. The third volumetric state 802 may be moved directly into the fifth volumetric state 1002 and back.

While not shown in the figures, the side walls and/or base of the expandable member 30a may include marked indicia for communicating information about the volumetric state being currently used. For example, a first marked indicia might provide information regarding the first state 602, a second marked indicia might provide information regarding the second state 702, a third marked indicia might provide information regarding a third state 802, a fourth marked indicia might provide information regarding a fourth state 902, and a fifth marked indicia might provide information regarding a fifth state 1002. These marked indicia may be on the inside or outside walls and/or base of the expandable member 30a for viewing internally or externally. These marked indicia may also all be located in distinct locations about the expandable member 30a for ease of differentiation between the volumes. Additionally, in some examples, some marked indicia may be hidden by the living hinges 606 when said living hinges 606 are closed such that the largest visible marked indicia indicates the current volumetric state of the expandable member 30a.

While the example expandable members 30a are illustrated as at least partially conical frustums, it is appreciated that any shape as desired may be used with the disclosure herein, with the only adjustments needing to be made including recalculation of the sizes of the living hinges to achieve correct volumes.

As an example of the volumetric state changes, consider an expandable member 30a having a first state 602 consisting of a volume of one U.S. cup. Changing to the second state 702 may decrease this volume to two-thirds of a U.S. cup. Changing this to the third state 802 may decrease this volume to one-half of a U.S. cup. Changing to the fourth state 902 may reduce this volume to one-third of a U.S. cup. Changing this to the fifth state 1002 may decrease this volume to one-fourth of a U.S. cup. According to some examples, when the expandable member 30a is in the fifth state 1002, the entirety of the reversible and expandable measuring device 10 may be flipped over to reveal a fourth volume 904 equivalent to that of the fourth state 902.

Again, these volumes are to be taken as examples only. The fact that the volumes effectively halve within their orientation of projection from a ring 50 (first direction 608 or second direction 706) is not intended to be limiting, as different sizes and positions of living hinges 606 may permit any ratio between consecutive same-side projection volumes.

Additionally, the use of U.S. cups is, for example, only. The invention disclosed herein may also be used for non-legal U.S. cup sizes, non-U.S. cup sizes, ounces, liters, milliliters, cubic meters, pints, quarts, teaspoons, tablespoons, gallons, etc., as well as fractions thereof and any combination of various units.

Aside from the ability of a single device to perform various measurements, other benefits are included in the disclosure of this invention. The collapsible nature of the expandable member facilitates savings in storage space. The contents of the expandable member 30 may be pushed out through the inversion of said expandable member 30. The removable handle 40 and ring 50 may permit the expandable member 30 to be fully "squeezed" without the intrusion of a non-flexible component, permitting further contents expulsion through force by the user. Additionally, because the handle 40 and ring 50 may be cast separately from the expandable member 30, manufacturing and maintenance are simplified over the prior art.

Prior art devices for collapsible measuring devices generally include a flexible material that may be compressed for storage. However, this flexible material is not intended to be inverted; if inverted, the volume would likely be the same or close to the same as the non-inverted orientation. Thus, these pans are still isolated to producing either standard-size or jumbo-sized muffins or cupcakes—not both at once. This means that a separate pan is required for both standard and jumbo sizes, which means more space is required for storing the additional pans.

For these reasons, the present disclosure includes a reversible and expandable muffin tray 20, as shown and described in FIGS. 12-20 seeks to remedy the deficiencies above in the prior art. Much of the disclosure is similar to that of the reversible and expandable measuring device of FIGS. 1-10, but instead of being utilized for precise measurement, the reversible and expandable muffin tray 20 may be used for differing sizes of goods, such as between muffins and cupcakes.

Figure 12:
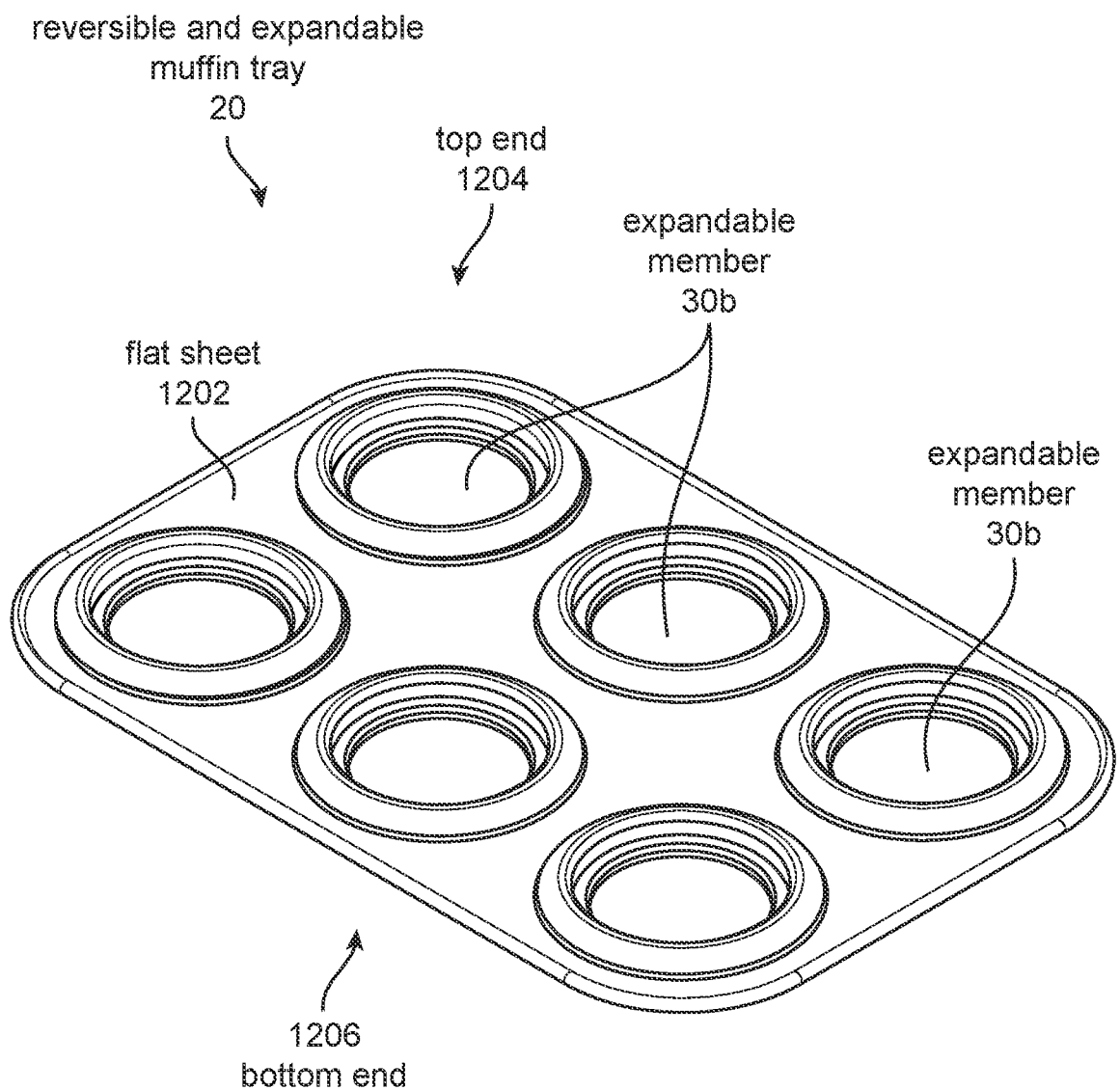
FIG. 12 illustrates a perspective view of a reversible and expandable muffin tray, according to some examples.

FIG. 12 illustrates a reversible and expandable muffin tray 20, including a flat sheet 1202 with a top end 1204 and a bottom end 1206. As with the previous disclosure, the top end 1204 and the bottom end 1206 are for orientation purposes only, and swapping which end is considered the top end 1204 and the bottom end 1206 would not change the enablement of the present disclosure.

Included in the reversible and expandable muffin tray 20 is at least one expandable member 30*b*. FIG. 12 (and FIGS. 13A and 13B) show six expandable members 30*b* (three of which are labeled, the other three are also understood to be expandable members 30*b*). While six expandable members 30*b*, are illustrated in FIGS. 12, 13A, and 13B, it is understood that as few as one expandable member 30*b* and more than six expandable members 30*b* may be implemented.

Figure 13A:
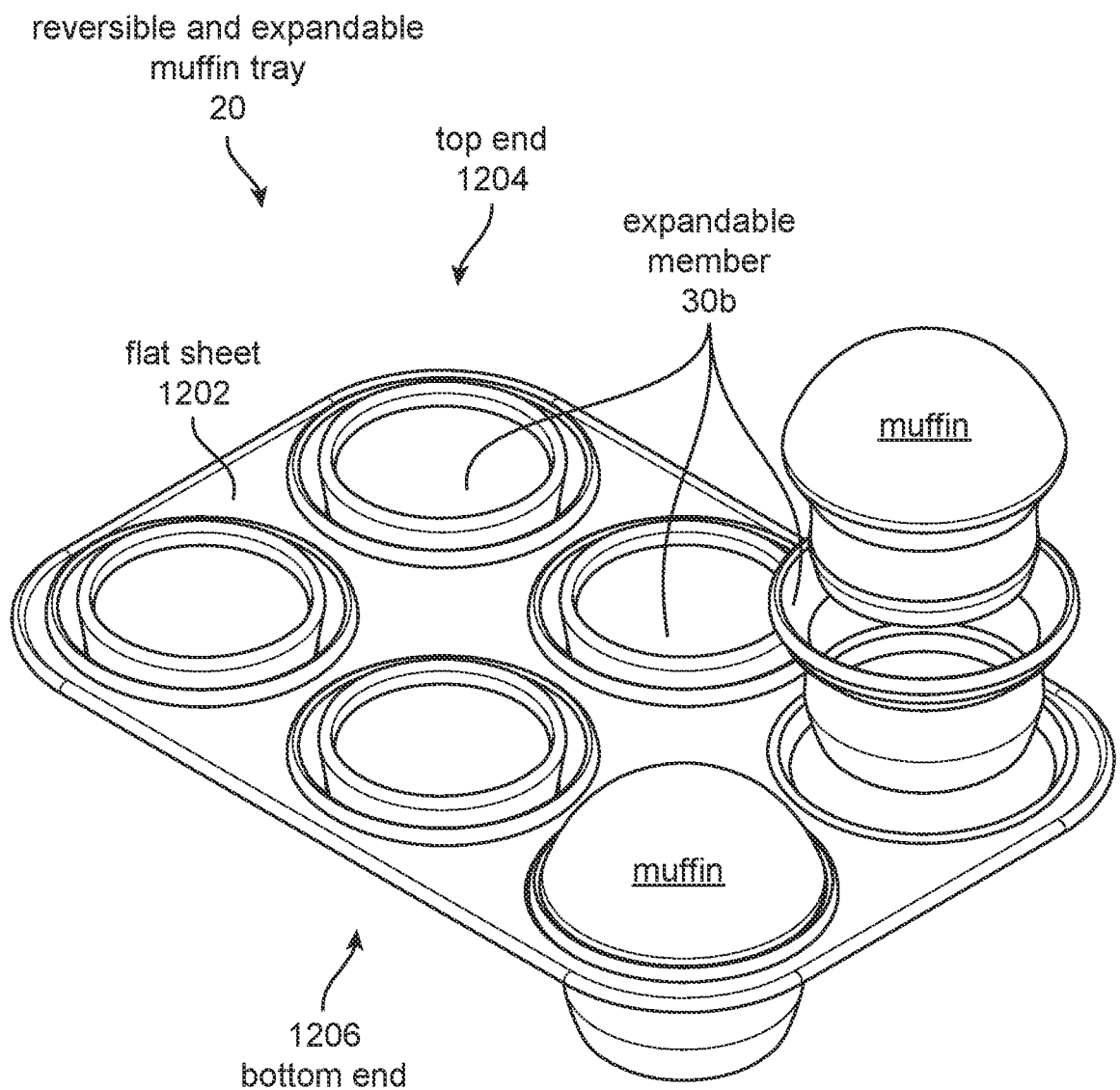
FIGS. 13A and 13B illustrate perspective views of the reversible and expandable muffin tray of FIG. 12, including contents, according to some examples.
Figure 13B:
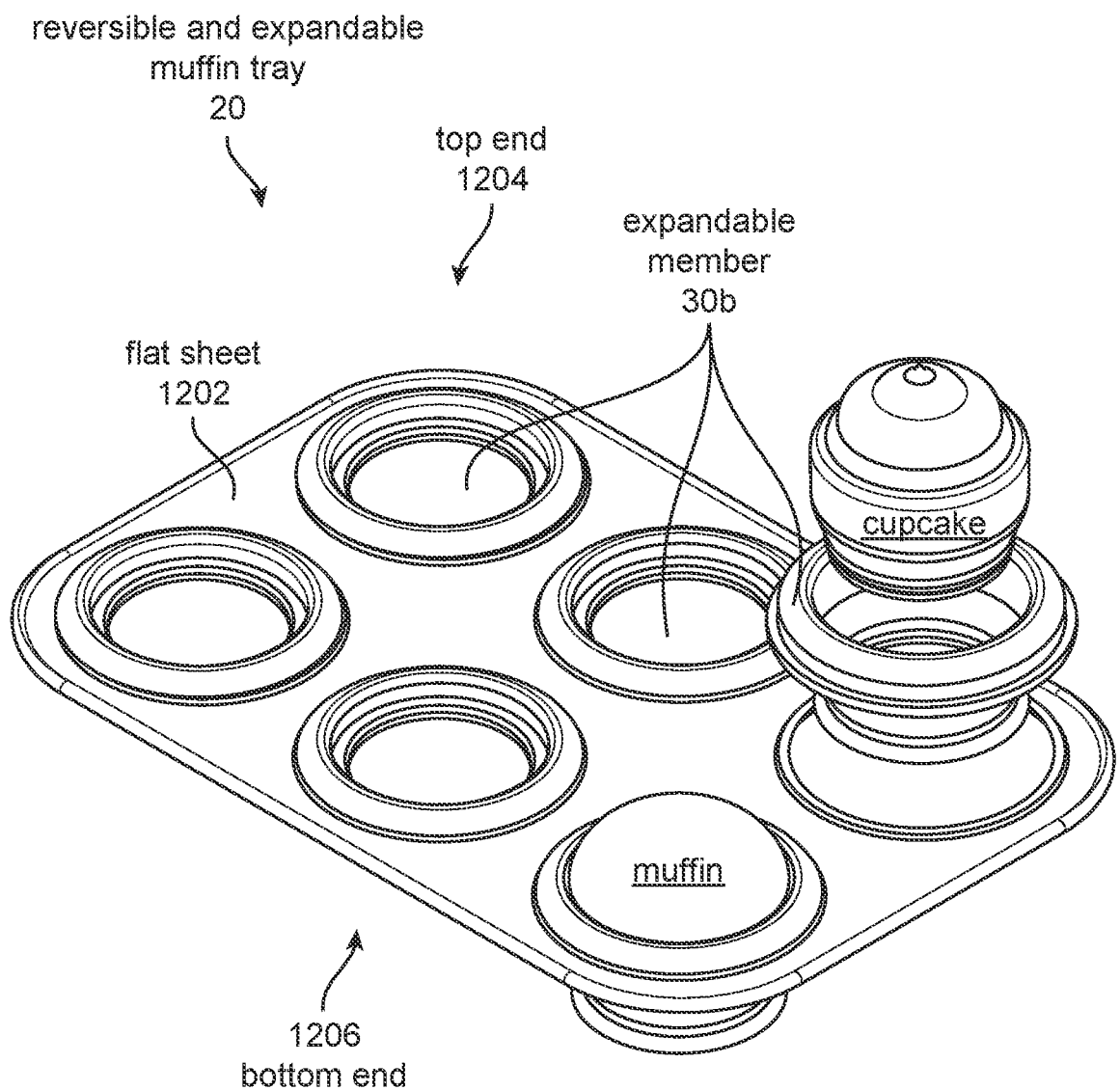

FIGS. 13A and 13B illustrate a perspective view of a reversible and expandable muffin tray 20, including components that may be placed within the expandable members 30*b*. FIG. 13A specifically shows muffins, one muffin already seated within the expandable member 30*b* and one muffin shown in a partially exploded view of the reversible and expandable muffin tray 20 along with the respective expandable member 30*b*.

FIG. 13B illustrates a cupcake and a muffin being used in the same reversible and expandable muffin tray 20. The muffin is already seated within the expandable member 30*b*, and the cupcake is shown in a partially exploded view of the reversible and expandable muffin tray 20 along with the respective expandable member 30*b*. While difficult to ascertain from FIG. 13B, the expandable member 30*b* respective to the cupcake may be inverted, providing a smaller volume for the smaller-sized cupcake than the nearby muffin.

While not shown, it is understood that all of the expandable members 30*b* within the reversible and expandable muffin tray 20 may be inverted, providing the same volume for each slot. This means that the reversible and expandable muffin tray 20 may permit all muffins, all cupcakes, or any combination thereof. Additionally, while the terms "muffin" and "cupcake" are used throughout, this is solely because of the traditionally understood difference in volumes between these two bakery items, and any other volumes may be used with this disclosure. It is understood that "cupcake" as used herein refers to traditionally sized muffins or cupcakes, and "muffin" as used herein refers to jumbo muffins.

While many of the presented figures illustrate an expandable member 30*b* detachably coupled to the flat sheet 1202, permanent or semi-permanent coupling may also be present in the current invention. In such examples, the expandable members 30*b* may be coupled to the flat sheet 1202 through the use of means such as adhesive or other, more permanent solutions than mechanical fits. However, because the nature of a permanent or semi-permanent coupling between the expandable members 30*b* and the flat sheet 1202 does not necessitate additional description, the figures will primarily relate to examples, including detachably coupling between said expandable members 30*b* and said flat sheet 1202.

Figure 14:
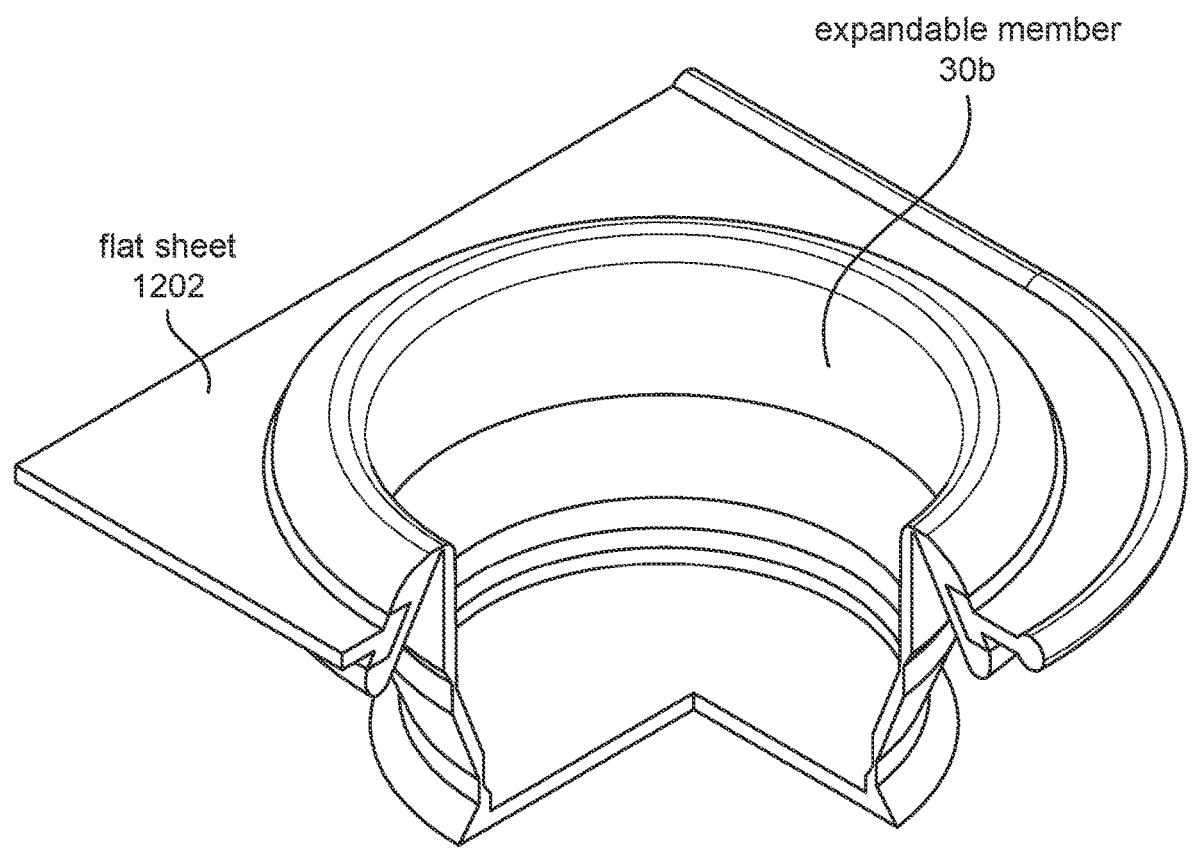
FIG. 14 illustrates a perspective view of a portion of a reversible and expandable muffin tray, according to some examples.

FIG. 14 illustrates a perspective view of a portion of a reversible and expandable muffin tray 20. The cut-out section of the expandable member 30*b* shows how the expandable member 30*b* mechanically couples to the flat sheet 1202 using a channel which will be described in greater detail in FIG. 16.

Figure 15:
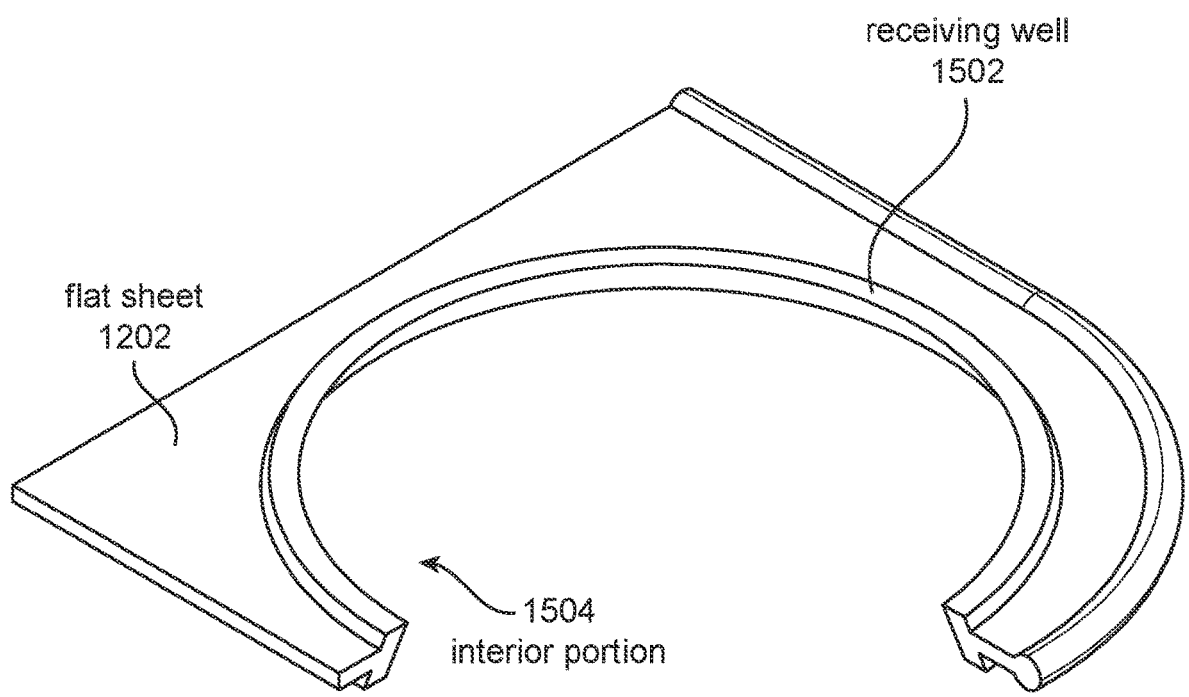
FIG. 15 illustrates a perspective view of the reversible and expandable muffin tray of FIG. without an expandable member, according to some examples.

FIG. 15 illustrates a perspective view of the reversible and expandable muffin tray 20 of FIG. 14 without the expandable member 30*b*. Here, a receiving well 1502 may be seen along with an interior portion 1504. The interior portion 1504 may receive a channel of the expandable members 30*b* for detachably coupling said expandable members to the flat sheet 1202.

Figure 16:
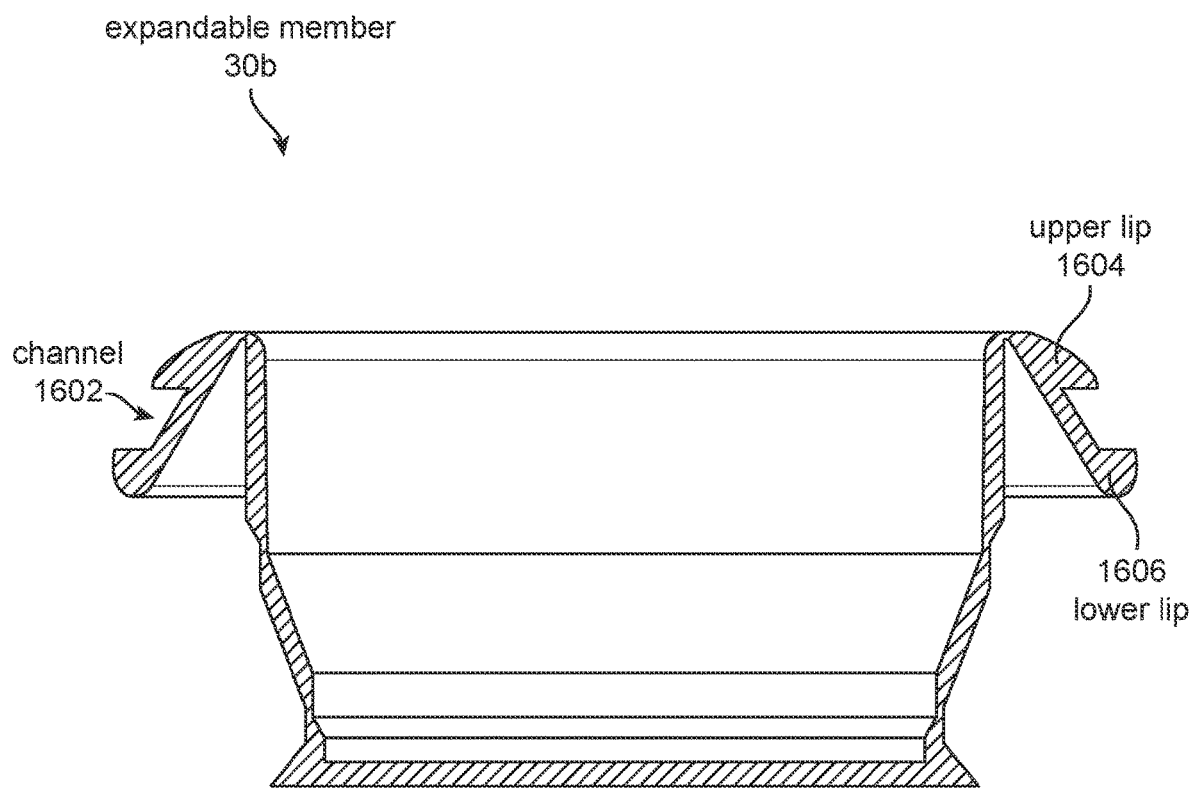
FIG. 16 illustrates a cross-sectional front view of an expandable member, according to some examples.

FIG. 16 illustrates a cross-sectional front view of an expandable member 30*b*. As seen in FIG. 16, the expandable member 30*b* may include a channel 1602 for detachably coupling to a flat sheet 1202, as described in preceding FIGS. 14 and 15. The channel 1602 may be further accompanied by an upper lip 1604 and a lower lip 1606, which may extend at least partially about the interior portion of the receiving well, thereby facilitating the coupling between the expandable member 30*b* and the flat sheet 1202.

Figure 17:
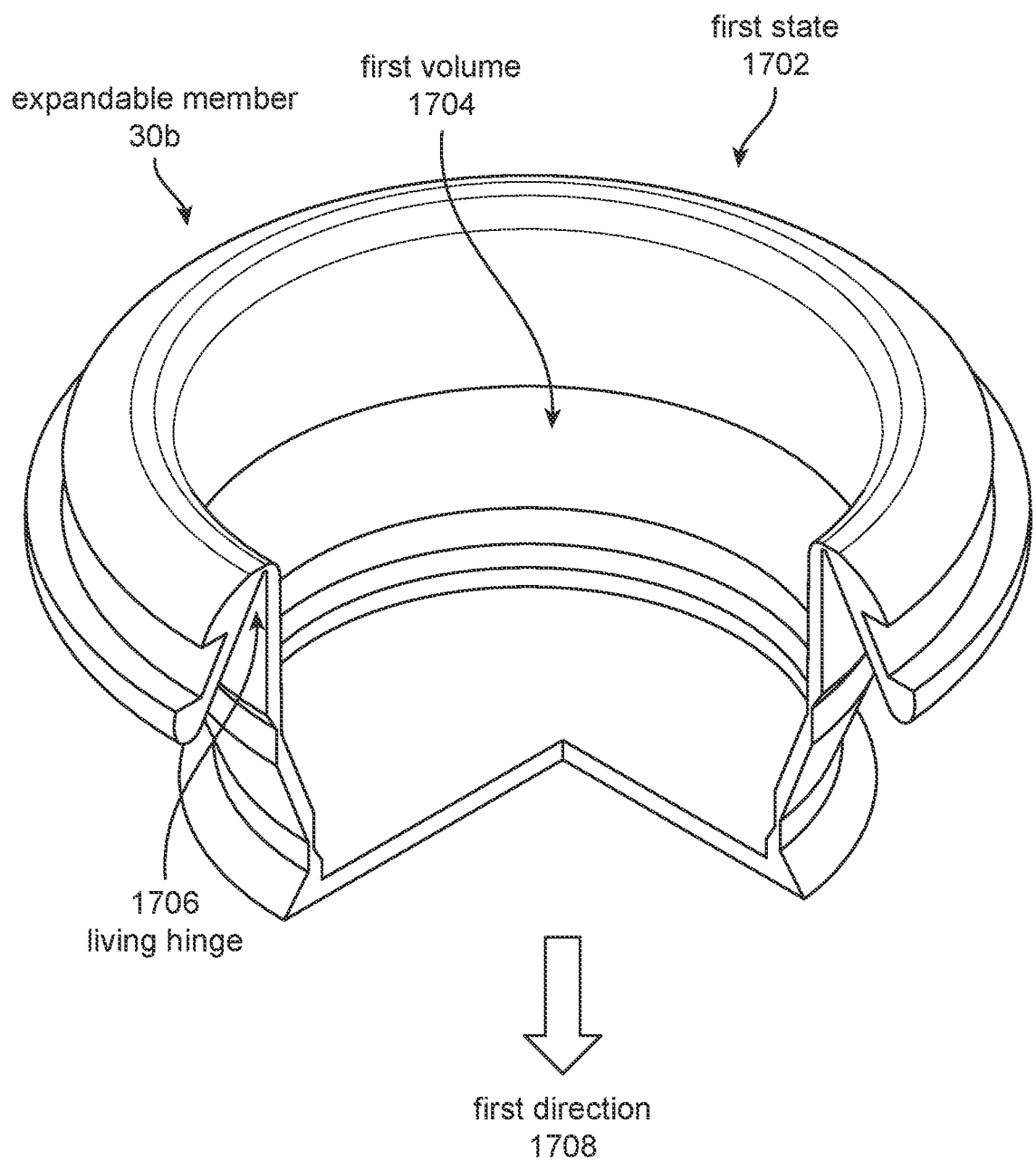
FIG. 17 illustrates a perspective view of an expandable member in a first state, according to some examples.

FIG. 17 illustrates a perspective view of an expandable member 30*b* in a first state 1702. This first state 1702 is the largest volumetric state possible by the expandable member 30*b*. In this first state 1702, a living hinge 1706 is shown in a closed position. In this closed position, an additional living hinge at the base of the expandable member 30*b* (not labeled in this figure) is open, providing the greatest possible height for the volume of the expandable member 30*b*, and, therefore, the greatest possible volume. While in the first state 1702, the expandable member 30*b* may protrude in a first direction 1708, which extends out of the bottom end 1206 of the flat sheet 1202.

Figure 18:
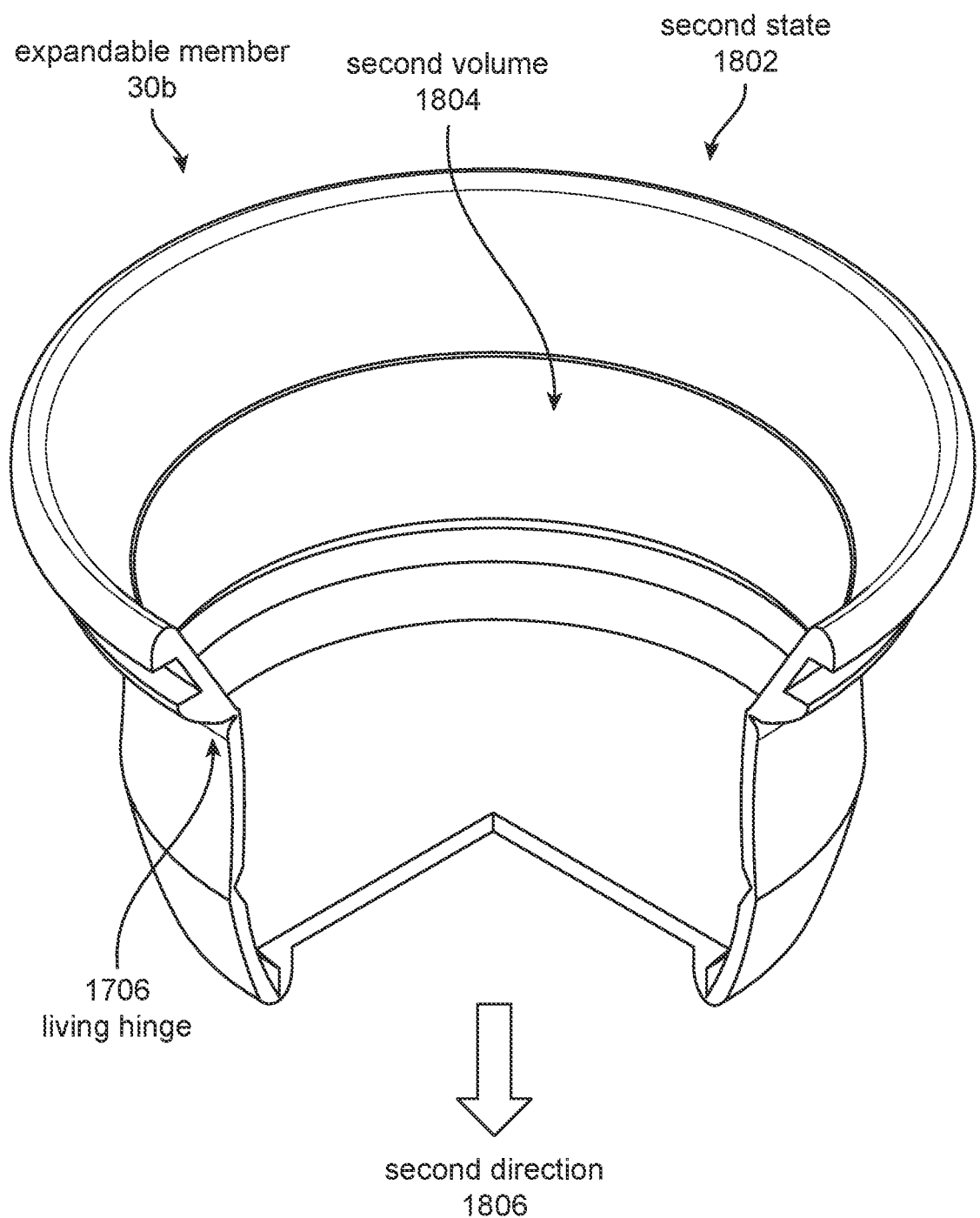
FIG. 18 illustrates a perspective view of the expandable member of FIG. 17 in a second state, according to some examples.

FIG. 18 illustrates a perspective view of the expandable member 30*b* of FIG. 17 in a second state 1802. Inverting the expandable member 30*b* causes the living hinge to be in an open position and the unlabeled living hinge at the base of the expandable member 30*b* to be in a closed position. The unlabeled living hinge at the base of the expandable member 30*b* causes the base to be higher in the expandable member, thereby decreasing the height of the volume of the expandable member 30*b*. This means that the second state 1802 is smaller than the first state 1702.

In the second volumetric state, the expandable member 30*b* may protrude in a second direction 1806 opposite the first direction 1708, extending out of the top end 1204 of the flat sheet 1202. Contra to FIGS. 7 and 9, the expandable member 30*b* of FIG. 18 is shown in the same orientation as FIG. 17, with the arrow showing a second direction 1806 instead of the first direction 1708. This was done for ease of viewing only, as there are two main states of expandable member 30*b*, as shown, as opposed to the five main states of expandable member 30*a* in FIGS. 6-10. It is understood that the configuration of expandable member 30*b* in FIG. 18 is inverted from the configuration of expandable member 30*b* in FIG. 17.

Figure 19:
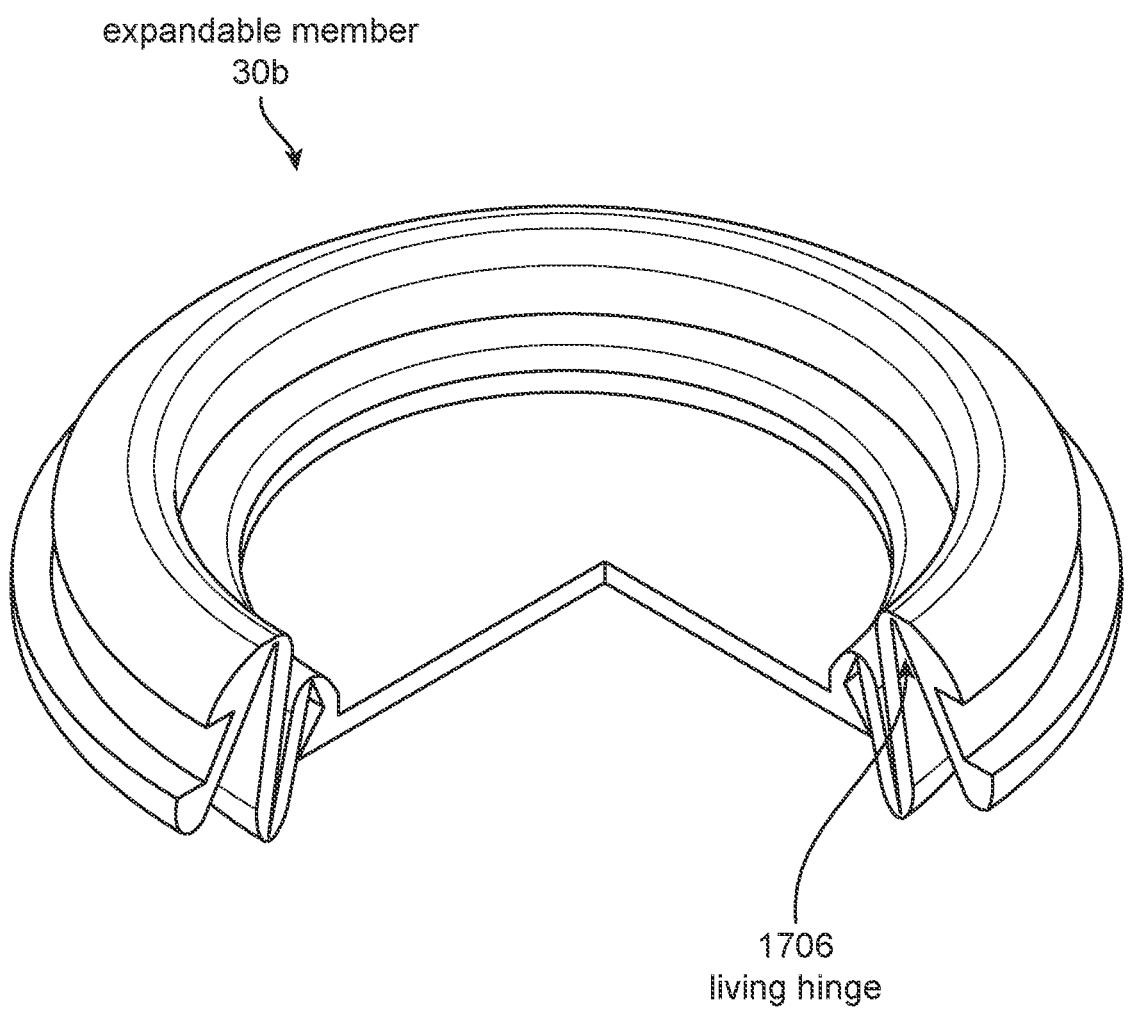
FIG. 19 illustrates a perspective view of the expandable member of FIG. 17 in a collapsed state, according to some examples.

FIG. 19 illustrates a perspective view of the expandable member 30*b* of FIGS. 17 and 18 in a collapsed state. In this collapsed state, the living hinge 1706 is in a closed position, and the device effectively collapses upon itself. This minimizes the profile of the expandable member 30*b* and may be helpful for storage as the reversible and expandable muffin tray 20 now takes up less real estate.

Figure 20:
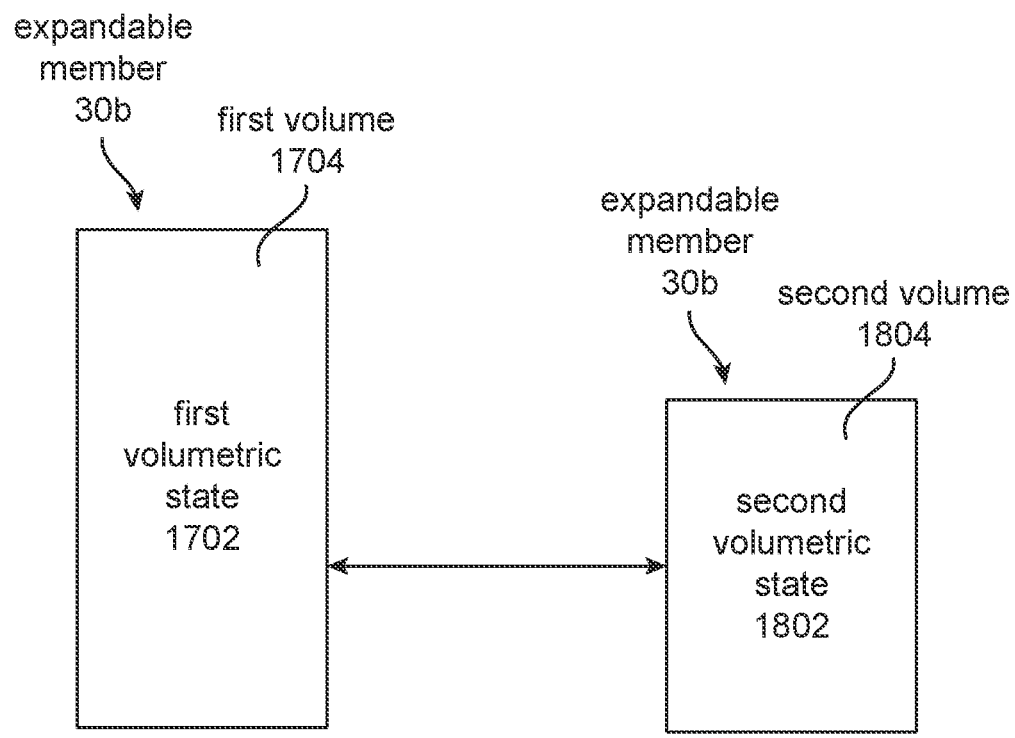
FIG. 20 illustrates a diagrammatic view of two states having different volumes, according to some examples.

FIG. 20 illustrates a diagrammatic view of two volumetric states having different volumes. For the purposes of this disclosure, and similar to the description of FIG. 11, it is understood that the use of "state" and "volumetric state" are interchangeable, e.g., in FIG. 17 the expandable member 30*b* is referred to as being in a first state 1702, while in FIG. 20 the expandable member 30*b* is referred to as being in a first volumetric state 1702.

FIG. 20 shows possible sizes of the first volume 1704 of the first volumetric state 1702 and the second volume 1804 of the second volumetric state 1804. A double-sided arrow indicates possible movement of the expandable member 30*b* from the first volumetric state 1702 to the second volumetric state 1802, as well as movement from the second volumetric state 1802 back to the first volumetric state 1702.

FIGS. 12-20 refer to a circular-shaped expandable member 30*b* with at least a partially conical frustum profile. This includes the receiving wells 1402, which, being circular, provides greater strength for the flat sheet 1202. However, it is understood that other shapes and profiles may be used for the expandable members 30*b* and the receiving wells 1402 while still being enabled by the present disclosure.

While not illustrated in FIGS. 12-20, marked indicia may be present in the expandable members 30*b*, either on an internal or external surface or the base. These marked indicia may include lines showing how high to fill the cups (particularly useful in baking with something like a batter), or writing, similar to the previous disclosure herein, indicating volume measurements of the presented volumetric state.

While not shown, the flat sheet 20 may be made out of any rigid, semi-rigid, or flexible material as desired. The flat sheet may be manufactured using various methods, such as metal casting, molding, stamping, etc.

In any of FIGS. 1-20, the expandable members 30 may include a tapered base. This tapered base may stabilize the expandable members 30 in isolation or in conjunction with the reversible and expandable measuring device 10 or the reversible and expandable muffin tray 20. The tapered base may also facilitate the control of the changing volume permitted by the volumetric state of the expandable member in each configuration, based on the size and angle of the taper.

This tapered base may also affect the shape of the volume within the expandable members 30. While this may be the case for either the expandable members 30*a* or the expandable members 30*b*, it is understood that this feature is particularly useful in the cases of muffins and cupcakes, as the diameter of the base and upper rims of muffins and cupcakes are known in the art to have different diameters, and thus different profiles. This means that, while the diameter of the rim of the expandable member 30*b* may not change, the shape of the volume may.

Additionally, when the expandable member 30*b* is configured to receive a muffin (first state 1702), the lip caused by the tapered base may prevent batter from creating a ring around the base of the muffin. This may also facilitate the creation of a flat base for the muffin.

Furthermore, the expandable members 30 may also be manufactured of any flexible material. These expandable members may be formed using various methods, such as injection molding Interpretation None of the steps described herein is essential or indispensable. Any of the steps can be adjusted or modified. Other or additional steps can be used. Any portion of any of the steps, processes, structures, and/or devices disclosed or illustrated in one embodiment, flowchart, or example in this specification can be combined or used with or instead of any other portion of any of the steps, processes, structures, and/or devices disclosed or illustrated in a different embodiment, flowchart, or example. The embodiments and examples provided herein are not intended to be discrete and separate from each other.

The section headings and subheadings provided herein are nonlimiting. The section headings and subheadings do not represent or limit the full scope of the embodiments described in the sections to which the headings and subheadings pertain. For example, a section titled "Topic 1" may include embodiments that do not pertain to Topic 1, and embodiments described in other sections may apply to and be combined with embodiments described within the "Topic 1" section.

To increase the clarity of various features, other features are not labeled in each figure.

The various features and processes described above may be used independently of one another or may be combined in various ways. All possible combinations and subcombinations are intended to fall within the scope of this disclosure. In addition, certain method, event, state, or process blocks may be omitted in some implementations. The methods, steps, and processes described herein are also not limited to any particular sequence, and the blocks, steps, or states relating thereto can be performed in other sequences that are appropriate. For example, described tasks or events may be performed in an order other than the order specifically disclosed. Multiple steps may be combined in a single block or state. The example tasks or events may be performed in serial, parallel, or some other manner. Tasks or events may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless expressly stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless expressly stated otherwise, is otherwise understood with the context as used in general to convey that an item, term, etc., may be either X, Y, or Z. Thus, such conjunctive language is not generally intended to imply that certain embodiments require at least one of X, at least one of Y, and at least one of Z to each be present.

The term "and/or" means that "and" applies to some embodiments, and "or" applies to some embodiments. Thus, A, B, and/or C can be replaced with A, B, and C written in one sentence and A, B, or C written in another sentence. A, B, and/or C means that some embodiments can include A and B, some embodiments can include A and C, some embodiments can include B and C, some embodiments can only include A, some embodiments can include only B, some embodiments can include only C, and some embodiments can include A, B, and C. The term "and/or" is used to avoid unnecessary redundancy.

While certain example embodiments have been described, these embodiments have been presented by way of example only and are not intended to limit the scope of the inventions disclosed herein. Thus, nothing in the foregoing description implies that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein.

What is claimed is:

1. A reversible and expandable measuring device, comprising:
    a handle comprising a first end and a second end opposite the first end;
    a ring coupled to the second end of the handle, the ring including a top end, a bottom end opposite the top end, and a side wall extending between the top end and the bottom end;
    an expandable member coupled to an interior portion of the side wall of the ring; and
    a first living hinge configured to enable the expandable member to move between a first volumetric state and a second volumetric state,
    wherein when the expandable member is in the first volumetric state, the expandable member protrudes in a first direction away from the bottom end of the ring,
    wherein when the expandable member is in the second volumetric state, the expandable member protrudes in a second direction away from the top end of the ring, the second direction being opposite the first direction, and
    wherein the first volumetric state is larger than the second volumetric state.

2. The reversible and expandable measuring device of claim 1, wherein the expandable member is configured to move between the first volumetric state, the second volumetric state, and a third volumetric state,
    wherein the second volumetric state is larger than the third volumetric state, and
    wherein when the expandable member is in the third volumetric state, the expandable member protrudes in the first direction.

3. The reversible and expandable measuring device of claim 2, wherein the expandable member is configured to move between the first volumetric state, the second volumetric state, the third volumetric state, and a fourth volumetric state,
    wherein the third volumetric state is larger than the fourth volumetric state, and
    wherein when the expandable member is in the fourth volumetric state, the expandable member protrudes in the second direction.

4. The reversible and expandable measuring device of claim 3, wherein the expandable member is configured to move between the first volumetric state, the second volumetric state, the third volumetric state, the fourth volumetric state, and a fifth volumetric state,
    wherein the fourth volumetric state is larger than the fifth volumetric state, and
    wherein when the expandable member is in the fifth volumetric state, the expandable member protrudes in the first direction.

5. The reversible and expandable measuring device of claim 4, wherein the first volumetric state defines one cup,
    wherein the second volumetric state defines two-thirds of a cup,
    wherein the third volumetric state defines one-half of a cup,
    wherein the fourth volumetric state defines one-third of a cup, and
    wherein the fifth volumetric state defines one-quarter of a cup.

6. The reversible and expandable measuring device of claim 4, further comprising:
    a first marked indicia located at a first location on the expandable member, the first marked indicia configured to provide information regarding a volume of the first volumetric state;
    a second marked indicia located at a second location on the expandable member, the second marked indicia configured to provide information regarding a volume of the second volumetric state;
    a third marked indicia located at a third location on the expandable member, the third marked indicia configured to provide information regarding a volume of the third volumetric state;
    a fourth marked indicia located at a fourth location on the expandable member, the fourth marked indicia configured to provide information regarding a volume of the fourth volumetric state; and
    a fifth marked indicia located at a fifth location on the expandable member, the fifth marked indicia configured to provide information regarding a volume of the fifth volumetric state.

7. The reversible and expandable measuring device of claim 1, wherein the expandable member is configured to detachably couple to the ring.

8. The reversible and expandable measuring device of claim 7, further comprising a channel extending around a perimeter of the expandable member, the channel configured to receive the ring.

9. The reversible and expandable measuring device of claim 8, wherein the expandable member further comprises an upper lip and a lower lip facing the upper lip, and
    wherein the upper lip and the lower lip are configured to mechanically couple the expandable member to the ring.

10. The reversible and expandable measuring device of claim 9, wherein the ring is located between the upper lip and the lower lip such that the expandable member defines an uppermost portion and a lowermost portion of the reversible and expandable measuring device.

11. The reversible and expandable measuring device of claim 1, wherein the ring is detachably coupled to the second end of the handle.

12. The reversible and expandable measuring device of claim 1, wherein the expandable member comprises a silicone material.

13. The reversible and expandable measuring device of claim 1, further comprising a second living hinge,
    wherein the expandable member is configured to define a third volumetric state and a fourth volumetric state,
    wherein the second living hinge is configured to enable the expandable member to move between the first volumetric state and the third volumetric state, and wherein the second living hinge is configured to enable the expandable member to move between the second volumetric state and the fourth volumetric state.

14. The reversible and expandable measuring device of claim 13, wherein the expandable member is configured to define a fifth volumetric state, the reversible and expandable measuring device further comprising a third living hinge configured to enable the expandable member to move between the third volumetric state and the fifth volumetric state.

15. A reversible and expandable muffin tray, comprising:
a flat sheet comprising a receiving well, the flat sheet including a top end and a bottom end opposite the top end; and
an expandable member coupled to an interior portion of the receiving well of the flat sheet,
wherein the expandable member is configured to define a first volumetric state and a second volumetric state,
wherein when the expandable member is in the first volumetric state, the expandable member protrudes in a first direction away from the bottom end of the flat sheet,
wherein when the expandable member is in the second volumetric state, the expandable member protrudes in a second direction away from the top end of the flat sheet, the second direction being opposite the first direction, and
wherein the first volumetric state is larger than the second volumetric state.

16. The reversible and expandable muffin tray of claim 15, wherein the expandable member is configured to detachably couple from the receiving well.

17. The reversible and expandable muffin tray of claim 16, further comprising a channel that extends around a perimeter of the expandable member, the channel configured to couple to the receiving well.

18. The reversible and expandable muffin tray of claim 17, wherein the expandable member further comprises an upper lip and a lower lip facing the upper lip, and
wherein the upper lip and the lower lip are configured to mechanically couple the expandable member to the receiving well.

19. The reversible and expandable muffin tray of claim 15, further comprising a living hinge configured to allow the expandable member to move between the first volumetric state and the second volumetric state.

20. The reversible and expandable measuring device of claim 6, wherein the first location, the second location, the third location, the fourth location, and the fifth location are different locations.

* * * * *